(12) United States Patent
Kim et al.

(10) Patent No.: US 10,963,020 B2
(45) Date of Patent: Mar. 30, 2021

(54) HINGE STRUCTURE AND ELECTRONIC DEVICE INCLUDING THE SAME

(71) Applicant: Samsung Electronics Co., Ltd., Gyeonggi-do (KR)

(72) Inventors: Jongyoon Kim, Gyeonggi-do (KR); Jungjin Kim, Gyeonggi-do (KR); Chungkeun Yoo, Gyeonggi-do (KR); Minsung Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/792,434

(22) Filed: Feb. 17, 2020

(65) Prior Publication Data

US 2020/0264674 A1 Aug. 20, 2020

(30) Foreign Application Priority Data

Feb. 19, 2019 (KR) ........................ 10-2019-0019573

(51) Int. Cl.
*G06F 1/16* (2006.01)

(52) U.S. Cl.
CPC .......... *G06F 1/1681* (2013.01); *G06F 1/1616* (2013.01); *G06F 1/1641* (2013.01); *G06F 1/1652* (2013.01)

(58) Field of Classification Search
CPC combination set(s) only.
See application file for complete search history.

(56) References Cited

U.S. PATENT DOCUMENTS

| 8,804,349 | B2 | 8/2014 | Lee et al. | |
| 9,677,308 | B1 | 6/2017 | Chen et al. | |
| 9,759,242 | B2 | 9/2017 | Hsu | |
| 10,001,810 | B2 | 6/2018 | Yoo et al. | |
| 10,274,996 | B2 * | 4/2019 | Lin | E05F 5/08 |
| 10,383,241 | B2 * | 8/2019 | Lin | G06F 1/1652 |
| 10,452,097 | B2 * | 10/2019 | Lin | G06F 1/1652 |
| 10,564,681 | B2 * | 2/2020 | Siddiqui | G06F 1/1616 |

(Continued)

FOREIGN PATENT DOCUMENTS

| CN | 207018340 U | 2/2018 |
| KR | 10-2008-0067458 A | 7/2008 |
| KR | 10-2018-0005476 A | 1/2018 |

OTHER PUBLICATIONS

International Search Report dated Jun. 10, 2020.

*Primary Examiner* — Lisa Lea-Edmonds
(74) *Attorney, Agent, or Firm* — Cha & Reiter, LLC.

(57) ABSTRACT

A hinge structure for an electronic device is disclosed, including: a fixed bracket including a first and second through-hole, a first connecting shaft inserted into the first through-hole, a first rotary bracket disposed between a fixed bracket and a support part, a first elastic member disposed partially in the first through-hole and supported by the second support part and pressing a fixed bracket towards the first rotary bracket, a second connecting shaft inserted into the second through-hole, a second rotary bracket disposed between a fixed bracket and a support part, a second elastic member disposed partially in the second through-hole and supported by another support part and pressing a fixed bracket towards the second rotary bracket, wherein at least one fixed bracket is disposed between the first rotary bracket and the second rotary bracket.

20 Claims, 18 Drawing Sheets

(56) References Cited

U.S. PATENT DOCUMENTS

| | | | |
|---|---|---|---|
| 10,775,852 B2* | 9/2020 | Kim | H05K 5/0017 |
| 10,824,189 B2* | 11/2020 | Lin | G06F 1/1652 |
| 2013/0201621 A1* | 8/2013 | Song | H05K 7/16 |
| | | | 361/679.27 |
| 2014/0111954 A1 | 4/2014 | Lee et al. | |
| 2014/0331452 A1* | 11/2014 | Zhang | G06F 1/1681 |
| | | | 16/337 |
| 2015/0345195 A1* | 12/2015 | Park | G06F 1/1683 |
| | | | 16/354 |
| 2015/0362956 A1* | 12/2015 | Tazbaz | G06F 1/1618 |
| | | | 361/679.27 |
| 2016/0083988 A1* | 3/2016 | Hsu | G06F 1/1681 |
| | | | 361/679.01 |
| 2016/0097227 A1 | 4/2016 | Hsu | |
| 2019/0369668 A1* | 12/2019 | Kim | G06F 1/1616 |
| 2020/0084305 A1* | 3/2020 | Lin | H04M 1/0216 |
| 2020/0264673 A1* | 8/2020 | Kim | G06F 1/1652 |

\* cited by examiner

HINGE STRUCTURE AND ELECTRONIC DEVICE INCLUDING THE SAME

CROSS-REFERENCE TO RELATED APPLICATION(S)

This application is based on and claims priority under 35 U.S.C. § 119 to Korean Patent Application No. 10-2019-0019573, filed on Feb. 19, 2019, in the Korean Intellectual Property Office, the disclosure of which is incorporated by reference herein its entirety.

BACKGROUND

1. Field

The disclosure relates to a hinge structure and an electronic device including the same.

2. Description of Related Art

A mobile electronic device, such as a smartphone, may provide various functions, such as telephone calls, video playback, Internet searching, and the like, based on various types of applications. A user may wish to use the aforementioned various functions through a display screen. Larger display screens are generally easier to use. However, portability of the device may be reduced as the screen increases in size. Accordingly, a foldable electronic device, capable of increasing both display size while maintain portability by using a folding structure, has been developed.

The above information is presented as background information only to assist with an understanding of the disclosure. No determination has been made, and no assertion is made, as to whether any of the above might be applicable as prior art with regard to the disclosure.

SUMMARY

In an electronic device including a flexible display, a hinge structure and the rear surface of the flexible display may be spaced apart from each other at a predetermined interval in a flat state to prevent collision of the rear surface of the flexible display and the hinge structure in a folding motion. The predetermined interval may increase the entire thickness of the electronic device including the flexible display.

To prevent axial separation of structures coupled to a connecting shaft, the hinge structure may include a belleville spring (e.g., a belleville spring-washer) that applies pressure in the axial direction of the connecting shaft. The belleville spring may have a shorter service life than a coil spring. Furthermore, the service life of the belleville spring may be substantially proportional to the area thereof. Therefore, a belleville spring capable of ensuring a sufficient service life may increase the size of the hinge structure and may increase the entire thickness of the electronic device.

Aspects of the disclosure are to address at least the above-mentioned problems and/or disadvantages and to provide at least the advantages described below. Accordingly, an aspect of the disclosure is to provide a hinge structure that provides a sufficient service life and has a small thickness, and an electronic device including the hinge structure.

In accordance with an aspect of the disclosure, at least one fixed bracket including a first through-hole and a second through-hole formed therein, a first connecting shaft extending in a first direction through an interior of the first through-hole and including a first support part formed on an end portion of the first connecting shaft and facing the first direction, a second support part formed on the end portion of the first connecting shaft facing a second direction opposite to the first direction, and a first gear formed between the first support part and the second support part, a first rotary bracket disposed between the at least one fixed bracket and the first support part, the first rotary bracket including a first circular arc-shaped opening through which the first connecting shaft passes, and a first internal gear formed on an inner wall of the first circular arc-shaped opening and engaged with the first gear, wherein the first rotary bracket rotates about a first virtual axis passing through the center of a circular arc of the first circular arc-shaped opening, a first elastic member, at least part of which is disposed in the first through-hole, the first elastic member being formed such that one side of the first elastic member is supported by the second support part and an opposite side of the first elastic member presses the at least one fixed bracket towards the first rotary bracket, a second connecting shaft extending in the second direction through the interior of the second through-hole and including a third support part formed on an end portion of the second connecting shaft facing the second direction, a fourth support part formed on the end portion of the second connecting shaft and facing the first direction, and a second gear formed between the third support part and the fourth support part and connected with the first gear, a second rotary bracket disposed between the at least one fixed bracket and the third support part, the second rotary bracket including a second circular arc-shaped opening through which the second connecting shaft passes and a second internal gear formed on an inner wall of the second circular arc-shaped opening and engaged with the second gear, wherein the second rotary bracket rotates about a second virtual axis passing through the center of a circular arc of the second circular arc-shaped opening, and a second elastic member, at least part of which is disposed in the second through-hole, the second elastic member being formed such that one side of the second elastic member is supported by the fourth support part and an opposite side of the second elastic member presses the at least one fixed bracket towards the second rotary bracket, wherein the at least one fixed bracket is disposed between the first rotary bracket and the second rotary bracket In accordance with another aspect of the disclosure, a housing structure including a first housing, a second housing, and a hinge housing disposed between the first housing and the second housing, a flexible display disposed on the housing structure so as to extend from the first housing to the second housing, the flexible display including a first area formed as a flat surface, a second area formed as a flat surface, and a folding area disposed between the first area and the second area, and configured as capable of being disposed as a flat surface or a curved surface, a hinge structure disposed in the hinge housing, the hinge structure disposed between the first housing and the second housing to enable rotation of the first housing and the second housing about a folding axis, wherein the hinge structure includes a first rotary structure connected with the first housing, a second rotary structure connected with the second housing, and at least one fixed structure disposed between the first rotary structure and the second rotary structure, and metal layers disposed between the hinge structure and the flexible display, the metal layers including attached areas attached to the first area and the second area, respectively, and unattached areas extending from the attached areas to the folding area, wherein the electronic device includes a first state in which the folding area is disposed as a flat surface and a second state in which the folding area is disposed as a curved surface, wherein the first rotary structure and the second rotary structure are configured to rotate about a first hinge axis and a second hinge axis, respectively, when the electronic device moves from the first state to the second state, wherein the unattached areas of the metal layers extend from the attached areas in a tangential direction of the folding area in the second state, and wherein the at least one fixed structure defines a recess on a surface facing the metal layers in the first state, the recess disposed to receive at least parts of the unattached areas when the electronic device is disposed in the second state.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, certain embodiments of the disclosure will be described with reference to the accompanying drawings. However, those of ordinary skill in the art will recognize that modification, equivalent, and/or alternative on the certain embodiments described herein can be variously made without departing from the disclosure.

Figure 1A:
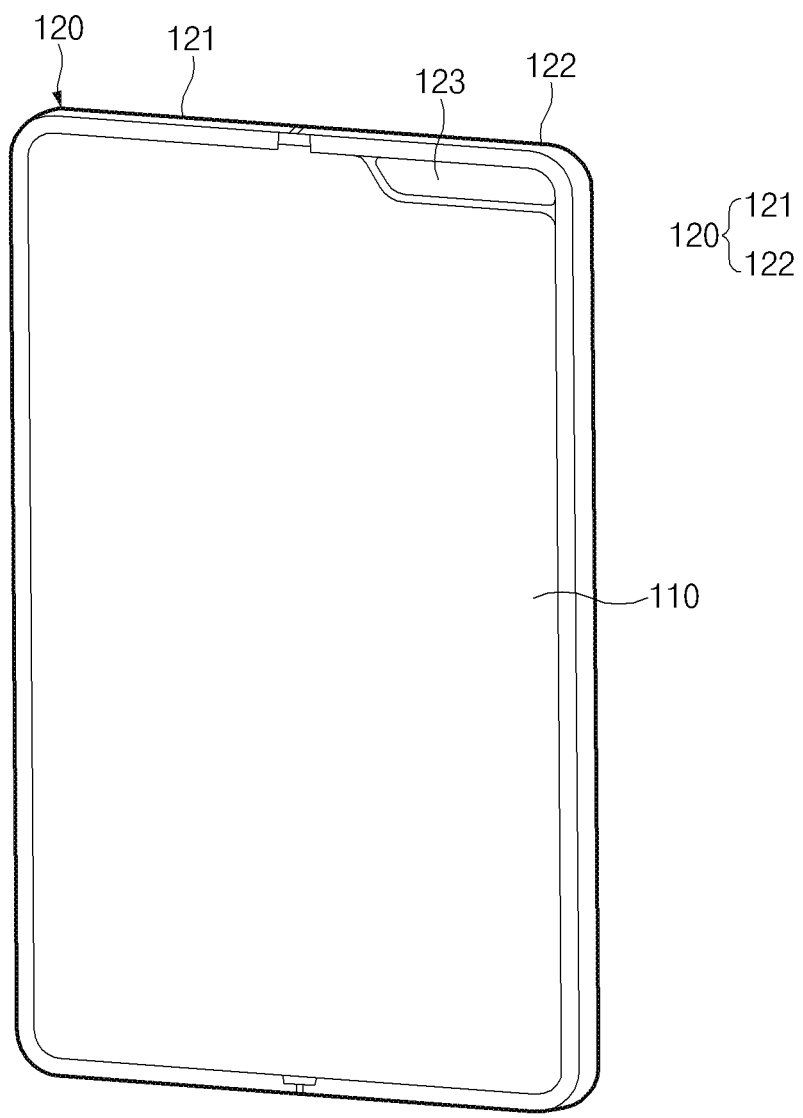
FIG. 1A is a view illustrating one example of the front exterior of an electronic device in a first state according to certain embodiments.
Figure 1B:
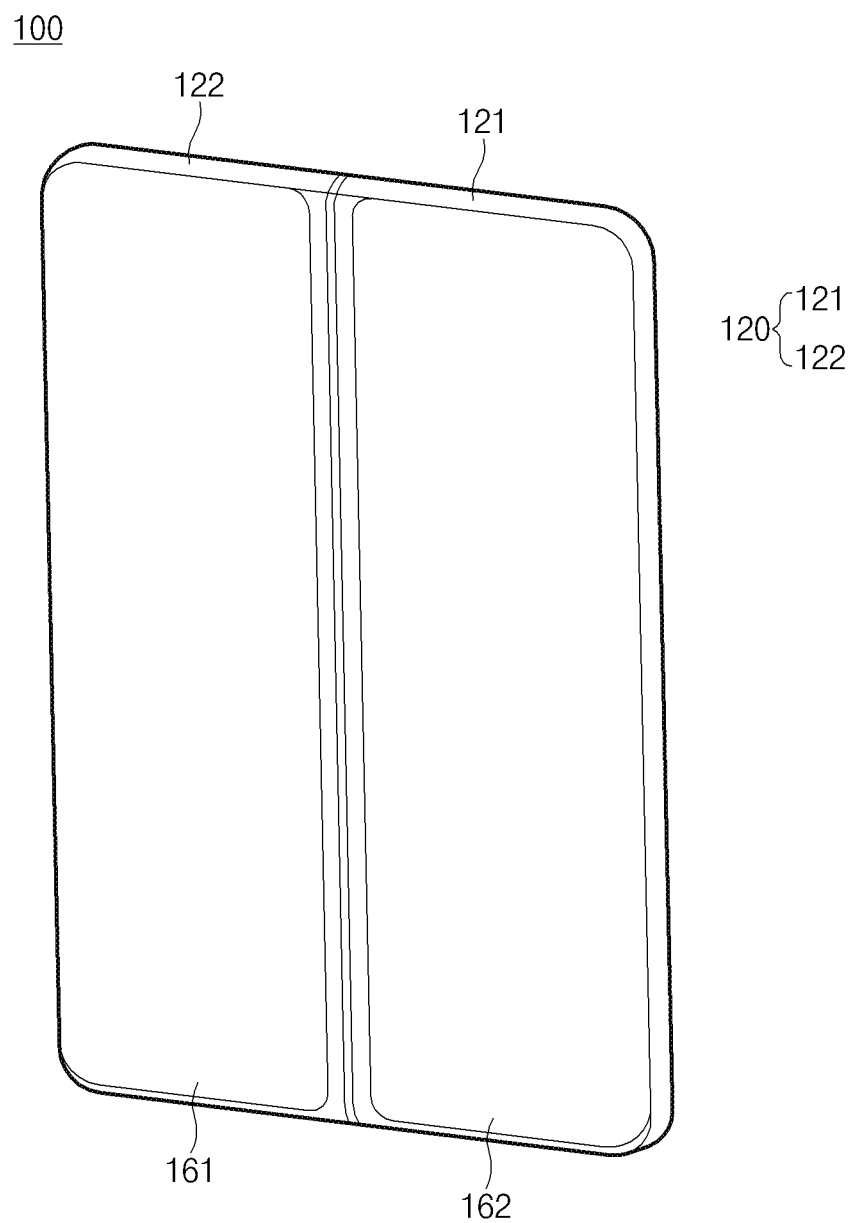
FIG. 1B is a view illustrating one example of the rear exterior of the electronic device in the first state according to certain embodiments.
Figure 1C:
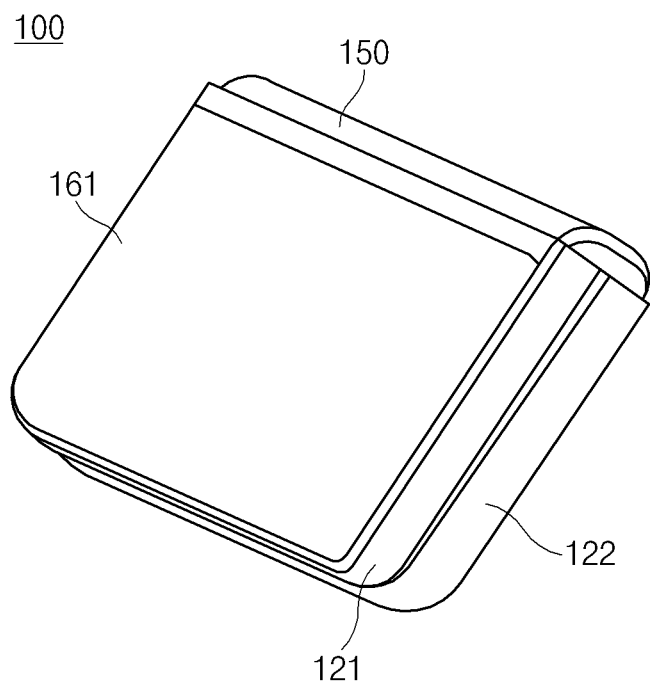
FIG. 1C is a view illustrating one example of the exterior of the electronic device in a second state according to certain embodiments.
Figure 1D:
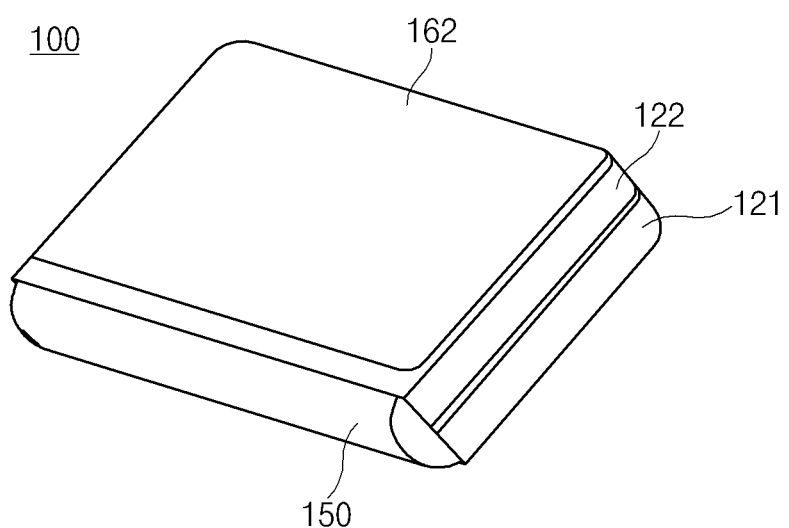
FIG. 1D is a view illustrating another example of the exterior of the electronic device in the second state according to certain embodiments.

FIG. 1A is a view illustrating one example of the front exterior of an electronic device in a first state according to certain embodiments. FIG. 1B is a view illustrating one example of the rear exterior of the electronic device in the first state according to certain embodiments. FIG. 1C is a view illustrating one example of the exterior of the electronic device in a second state according to certain embodiments. FIG. 1D is a view illustrating another example of the exterior of the electronic device in the second state according to certain embodiments.

FIGS. 1A and 1B illustrate the front side and the rear side of the electronic device 100 in the first state (e.g., a flat state or an unfolded state), and FIGS. 1C and 1D are perspective views including the upper and lower sides (or the right and left sides) of the electronic device 100 in the second state (e.g., a folded state).

Referring to FIGS. 1A to 1D, the electronic device 100 according to certain embodiments may include a housing 120 including a first housing 121 and a second housing 122, a flexible display 110, a first cover 161, a second cover 162, and a hinge housing 150 having a hinge structure disposed therein.

According to certain embodiments, depending on an arrangement, the first housing 121 may be disposed so as to be continuous with the second housing 122 (e.g., when a folding area of the flexible display 110 is flat), or may be disposed side by side with the second housing 122. Alternatively, when the central portion of the flexible display 110 is folded, the first housing 121 and the second housing 122 may be disposed such that one side of the first housing 121 faces one side of the second housing 122.

At least part of the first housing 121 may be formed of a metallic material, or at least part of the first housing 121 may be formed of a non-metallic material. For example, the first housing 121 may be formed of a material having a predetermined stiffness to support at least part of the flexible display 110. One area of the flexible display 110 may be disposed on part of the front side of the first housing 121. The first housing 121 may have an empty space therein, or may be coupled with the first cover 161 to form an empty space. Electronic components (e.g., a printed circuit board, and components, such as at least one processor, at least one memory, and a battery, which are mounted on the printed circuit board) that are utilized to drive the flexible display 110 may be disposed in the empty space. According to certain embodiments, the periphery of the first housing 121 may be provided in a form that surrounds a periphery on one side of the flexible display 110.

According to certain embodiments, depending on an arrangement, the second housing 122 may be disposed side by side with the first housing 121, or may be disposed such that at least one side of the second housing 122 faces the first housing 121. The second housing 122 may be formed of the same material as that of the first housing 121. The second housing 122 may be disposed to be horizontally or vertically symmetric to the first housing 121, and at least part of the remaining area of the flexible display 110 may be disposed and supported on the front side of the second housing 122. Similarly to the first housing 121, the second housing 122 may have an empty space therein, or may be coupled with the second cover 162 to form an empty space. Electronic components utilized to drive the flexible display 110 may be disposed in the empty space. According to certain embodiments, the periphery of the second housing 122 may be provided in a form that surrounds a periphery on an opposite side of the flexible display 110.

According to certain embodiments, the electronic device 100 may include, on a side of the second housing 122, a sensor arrangement area 123 in which at least one sensor associated with operating a specific function of the electronic device 100 is disposed. For example, at least one of a proximity sensor, an illuminance sensor, an iris sensor, an image sensor (or a camera), or a fingerprint sensor may be disposed in the sensor arrangement area 123. According to certain embodiments, the sensor arrangement area 123 may be located on the rear side of the electronic device 100 when the at least one sensor is disposed on the rear side of the electronic device 100.

According to certain embodiments, depending on the folded or flat state of the electronic device 100, the hinge housing 150 may be hidden by one side of the first housing 121 and one side of the second housing 122 (e.g., a flat state of the housing 120), or may be exposed to the outside (e.g., a folded state of the housing 120). For example, as illustrated in FIGS. 1A and 1B, the hinge housing 150 may be hidden by the first housing 121 and the second housing 122 when the first housing 121 and the second housing 122 are arranged side by side. As illustrated in FIGS. 1C and 1D, the hinge housing 150 may be exposed to the outside from between lateral portions of the first housing 121 and the second housing 122 when one side of the first housing 121 and one side of the second housing 122 face each other.

According to certain embodiments, at least part of the flexible display 110 may be foldable. According to certain embodiments, the flexible display 110 may include a first area disposed on the first housing 121, a second area disposed on the second housing 122, and a folding area within a predetermined range with respect to the area to which the first housing 121 and the second housing 122 are adjacent. At least part of the folding area may be flexible.

Figure 2:
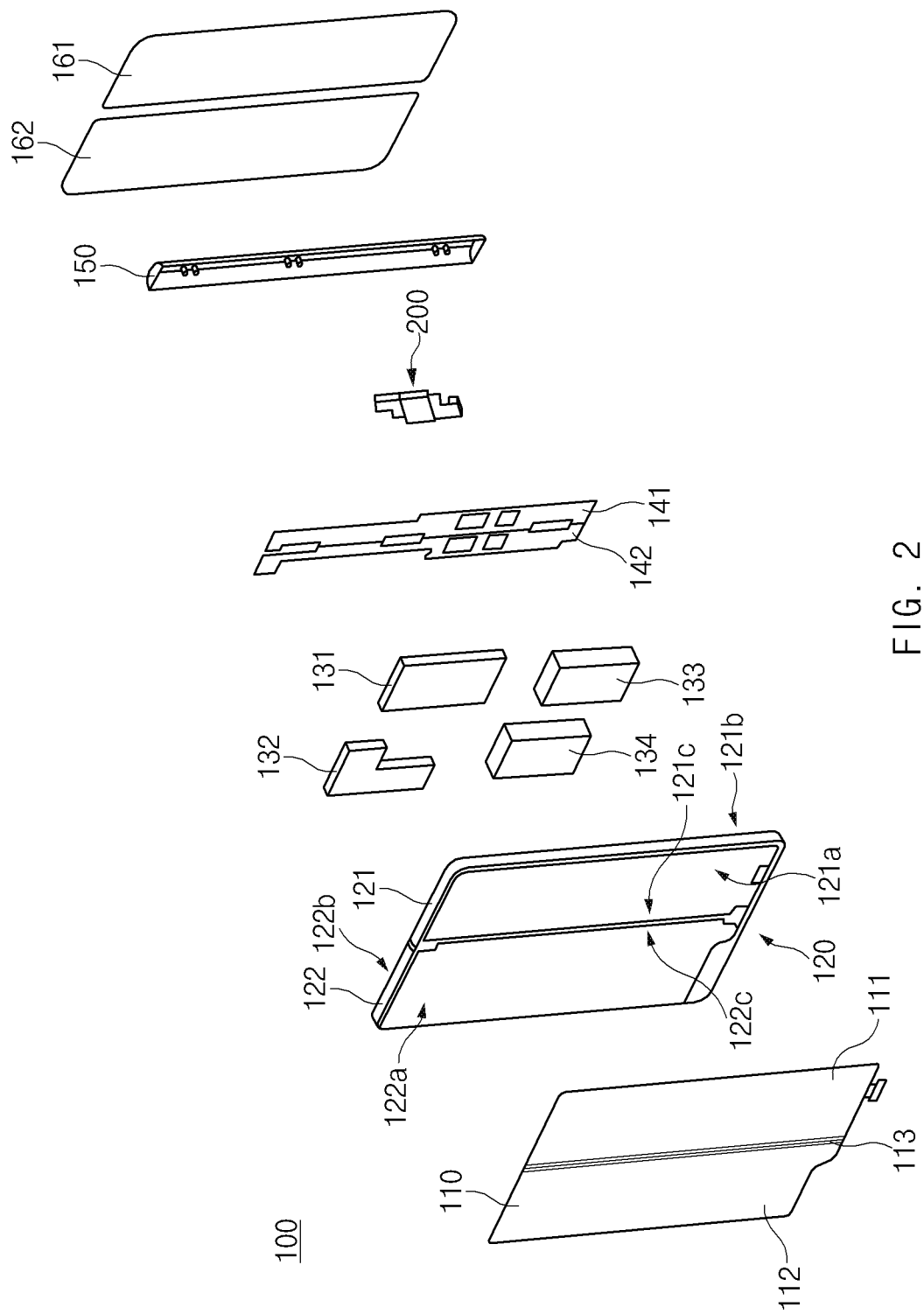
FIG. 2 illustrates one example of an exploded perspective view of the electronic device according to certain embodiments.

FIG. 2 illustrates one example of an exploded perspective view of the electronic device according to certain embodiments.

Referring to FIG. 2, the electronic device 100 according to certain embodiments may include the flexible display 110, the housing 120, electronic device components, for example, a first printed circuit board 131 and a second printed circuit board 132, a first battery 133 and a second battery 134, hinge plates 141 and 142, a hinge structure 200, and a first cover 161 and a second cover 162.

According to certain embodiments, the flexible display 110 may include a first area 111, a second area 112, and a folding area 113. The folding area 113 may include a predetermined area that is located on a central portion inside while the flexible display 110 is folded. At least part of the first area 111 may be fixedly attached to the first housing 121. At least part of the second area 112 may be fixedly attached to the second housing 122. The folding area 113 may be disposed so as not to be fixed (or attached) to the first housing 121 and the second housing 122. Accordingly, while the flexible display 110 is folded or unfolded, the folding area 113 may be moved without being attached to the first housing 121 and the second housing 122.

According to certain embodiments, the first housing 121 may include a first surface 121*a* and a second surface 121*b* opposite to the first surface 121*a*, and the second housing 122 may include a third surface 122*a* and a fourth surface 122*b* opposite to the third surface 122*a*. The first housing 121 and the second housing 122 may be folded or unfolded about the hinge structure 200. In a state in which the flexible display 110 is folded (or the first housing 121 and the second housing 122 are stacked on each other), the third surface 122*a* may face the first surface 121*a*, and in a state in which the flexible display 110 is flat, the first surface 121*a* and the third surface 122*a* may face the same direction, and a first peripheral portion 121*c* of the first housing 121 may be connected with a second peripheral portion 122*c* of the second housing 122. The flexible display 110 may be disposed across at least part of the first surface 121*a* and at least part of the third surface 122*a*. The flexible display 110 may be folded at the first peripheral portion 121*c* and the second peripheral portion 122*c*, or may be folded in an area adjacent to the first peripheral portion 121*c* and the second peripheral portion 122*c*.

According to certain embodiments, the first printed circuit board 131 may be disposed between the second surface 121*b* of the first housing 121 and the first cover 161. The second printed circuit board 132 may be disposed between the fourth surface 122*b* of the second housing 122 and the second cover 162. Alternatively, the first printed circuit board 131 and the second printed circuit board 132 may be integrated into one printed circuit board and may be disposed between the second surface 121*b* of the first housing 121 and the first cover 161 or between the fourth surface 122*b* of the second housing 122 and the second cover 162. Various electronic components utilized to drive the electronic device 100 may be disposed on the first printed circuit board 131 and the second printed circuit board 132. For example, components, such as a memory, at least one processor, communication circuitry, an antenna, a microphone, a speaker, at least one sensor and an electronic component associated with driving the sensor, or a camera, may be mounted on at least one of the first printed circuit board 131 and the second printed circuit board 132.

According to certain embodiments, the first battery 133 may be disposed between the second surface 121*b* of the first housing 121 and the first cover 161. The second battery 134 may be disposed between the fourth surface 122*b* of the second housing 122 and the second cover 162. The first battery 133 and the second battery 134 may supply power utilized to drive the electronic device 100. According to certain embodiments, the first battery 133 and the second battery 134 may supply power to components, such as at least one of the first printed circuit board 131 and the second printed circuit board 132, the flexible display 110, and at least one sensor, through interconnections. Although it has been exemplified that the electronic device 100 includes the plurality of batteries 133 and 134, the disclosure is not limited thereto. For example, the electronic device 100 may include one battery.

The hinge plates 141 and 142 may include the first hinge plate 141 coupled with the first housing 121 and one side of the hinge structure 200 and the second hinge plate 142 coupled with the second hinge housing 122 and an opposite side of the hinge structure 200. The first hinge plate 141 may be fixed, at one side thereof, to the edge of the first housing 121 that is adjacent to the second housing 122 and may be fixed, at an opposite side thereof, to part of the hinge structure 200. Accordingly, a force (or pressure) applied while a user folds or unfolds the first housing 121 or the second housing 122 may be transmitted to at least part of the hinge structure 200. For example, the second hinge plate 142 may be fixed, at one side thereof, to the edge of the second housing 122 that is adjacent to the first housing 121 and may be fixed, at an opposite side thereof, to the remaining part of the hinge structure 200. Accordingly, a force (or pressure) generated while the user folds or unfolds the first housing 121 or the second housing 122 may be transmitted to the remaining part of the hinge structure 200.

The hinge housing 150 may have a semi-cylindrical shape (or a container shape that has a semi-elliptical cross-section) and may have a structure that is closed at both ends. The hinge housing 150 may have an empty space therein in which one or more hinge structures 200 are mounted. The hinge housing 150 may be formed to have a length that corresponds to the length of the flexible display 110 in the direction of one axis thereof (e.g., a long axis) or the length of the first housing 121 in the direction of one axis thereof (e.g., a long axis). The hinge housing 150 may have a semi-circular, semi-elliptical, or partially-curved cross-section.

According to certain embodiments, the first cover 161 may be disposed on the rear surface of the first housing 121 to cover at least part of the second surface 121b of the first housing 121. The first cover 161 may be disposed to cover part of the hinge structure 200 (e.g., one side of the hinge housing 150) that is disposed between the first housing 121 and the second housing 122. The first cover 161 may have rounded corners. The first cover 161 may have an empty space inside, or may be fastened to the second surface 121b of the first housing 121 to form an empty space between the first housing 121 and the first cover 161. For example, the first cover 161 may have a structure with a rectangular bottom surface and sidewalls formed on an upper side and left and right sides of the bottom surface.

According to certain embodiments, the second cover 162 may be disposed adjacent to the first cover 161 and may be fastened to the fourth surface 122b of the second housing 122 to cover at least part of the second housing 122 (e.g., at least part of the fourth surface 122b). The second cover 162 may be disposed to cover the remaining part of the hinge structure 200 (e.g., an opposite side of the hinge housing 150) that is partially hidden by the first cover 161. The second cover 162 may have rounded corners, similarly to the first cover 161. The second cover 162 may have an empty space inside, or may be fastened to the fourth surface 122b of the second housing 122 to form an empty space between the second housing 122 and the second cover 162. In this regard, the second cover 162 may have a structure with a rectangular bottom surface and sidewalls formed on a lower side and left and right sides of the bottom surface.

Figure 3:
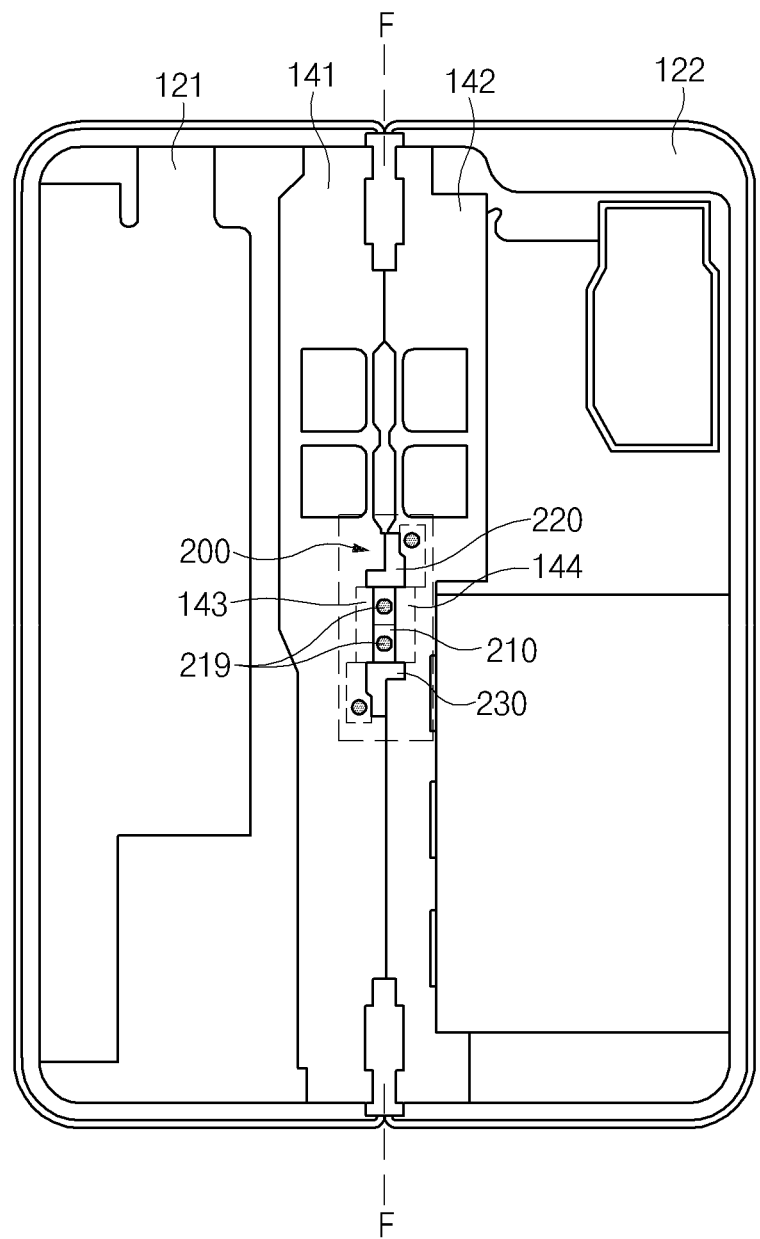
FIG. 3 is a view illustrating an arrangement of a first housing, a second housing, and a hinge structure of the electronic device according to an embodiment.

FIG. 3 is a view illustrating an arrangement of the first housing 121, the second housing 122, and the hinge structure 200 of the electronic device 100 according to an embodiment. FIG. 3 illustrates the electronic device 100 in a flat state from which the flexible display 110 is omitted.

In an embodiment, the electronic device 100 may include the first housing 121, the second housing 122, the hinge structure 200, the first hinge plate 141 connecting the hinge structure 200 and the first housing 121, and the second hinge plate 142 connecting the hinge structure 200 and the second housing 122.

In an embodiment, the first housing 121 and the second housing 122 may be rotated about a folding axis F. The folding axis F may be formed parallel to the central axis of the hinge structure 200.

In an embodiment, the hinge structure 200 may include a fixed bracket 210 fixedly disposed on the hinge housing 150, and a first rotary bracket 220 and a second rotary bracket 230 that are coupled to the fixed bracket 210 so as to be rotatable.

In an embodiment, the fixed bracket 210 may include a fixing hole 219 into which a fastening member is inserted. The fixing hole 219 may include one or more openings. Referring to FIG. 3, the fixing hole 219, when viewed from above, may be formed at a position where the folding axis F passes. The fastening member may be fastened to the hinge housing 150 through the fixing hole 219.

In an embodiment, the first hinge plate 141 may be connected with the first housing 121 and the second rotary bracket 230. Accordingly, the first hinge plate 141, together with the first housing 121, may rotate about the folding axis F when the second rotary bracket 230 rotates about the folding axis F. The first hinge plate 141 may include a first guide area 143 that is disposed to overlap the fixed bracket 210. The first guide area 143 may be supported by the fixed bracket 210. The first guide area 143 may restrict the range of rotation of the first housing 121 when the second rotary bracket 230 rotates (e.g., rotates from a folded state to a flat state). For example, the first guide area 143 may guide the range of rotation of the first hinge plate 141 such that the angle between the first hinge plate 141 and the second hinge plate 142 does not exceed 180 degrees.

In an embodiment, the second hinge plate 142 may be connected with the second housing 122 and the first rotary bracket 220. Accordingly, the second hinge plate 142, together with the second housing 122, may rotate about the folding axis F when the first rotary bracket 220 rotates about the folding axis F. The second hinge plate 142 may include a second guide area 144 that is disposed to overlap the fixed bracket 210. The second guide area 144 may be supported by the fixed bracket 210. The second guide area 144 may restrict the range of rotation of the second housing 122 when the first rotary bracket 220 rotates (e.g., rotates from a folded state to a flat state). For example, the second guide area 144 may guide the range of rotation of the second hinge plate 142 such that the angle between the second hinge plate 142 and the first hinge plate 141 does not exceed 180 degrees.

In an embodiment, the first rotary bracket 220 may be disposed on one side of the fixed bracket 210 in the direction of the folding axis F. The first rotary bracket 220 may be coupled to the fixed bracket 210 so as to be rotatable relative to the fixed bracket 210. The first rotary bracket 220 may be connected to the second housing 122 through the second hinge plate 142. Accordingly, when the first rotary bracket 220 rotates, the second hinge plate 142 and the second housing 122 may rotate about the folding axis F together.

In an embodiment, the second rotary bracket 230 may be disposed on an opposite side of the fixed bracket 210 in the direction of the folding axis F. The second rotary bracket 230 may be coupled to the fixed bracket 210 so as to be rotatable relative to the fixed bracket 210. The second rotary bracket 230 may be connected to the first housing 121 through the first hinge plate 141. Accordingly, when the second rotary bracket 230 rotates, the first hinge plate 141 and the first housing 121 may rotate about the folding axis F together.

Figure 4:
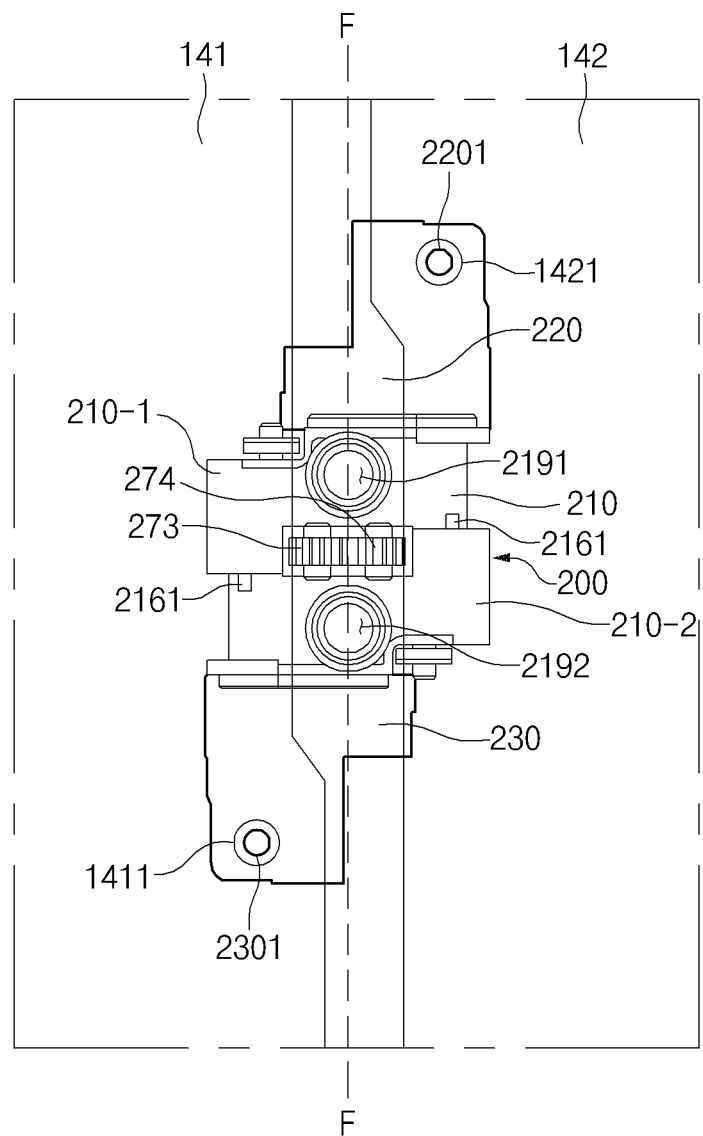
FIG. 4 is a view illustrating connection of the first housing, the second housing, and the hinge structure of the electronic device according to an embodiment.

FIG. 4 is a view illustrating connection of the first housing 121, the second housing 122, and the hinge structure 200 of the electronic device 100 according to an embodiment.

Referring to FIG. 4, the first hinge plate 141 and the second hinge plate 142 may be disposed to be substantially symmetric to each other with respect to the folding axis F. For example, the first hinge plate 141 may be disposed on one side of the folding axis F (e.g., on the left side with respect to the drawing), and the second hinge plate 142 may be disposed on an opposite side of the folding axis F (e.g., on the right side with respect to the drawing).

In an embodiment, the first hinge plate 141 may include a fastening hole 1411 for connection with the second rotary bracket 230. The fastening hole 1411 may be formed to be aligned with a corresponding fastening hole 2301 formed in the second rotary bracket 230. The first hinge plate 141 and the second rotary bracket 230 may be connected by a fastening member that is inserted into the fastening hole 1411 and the corresponding fastening hole 2301. However, without being limited thereto, the coupling structures of the first hinge plate 141 and the second rotary bracket 230 may include various coupling structures.

In an embodiment, the second hinge plate 142 may include a fastening hole 1421 for connection with the first rotary bracket 220. The fastening hole 1421 may be formed to be aligned with a corresponding fastening hole 2201 formed in the first rotary bracket 220. The second hinge plate 142 and the first rotary bracket 220 may be connected by a fastening member that is inserted into the fastening hole 1421 and the corresponding fastening hole 2201. However, without being limited thereto, the coupling structures of the second hinge plate 142 and the first rotary bracket 220 may include various coupling structures.

In an embodiment, the fixed bracket 210 may include a first fixed bracket 210-1 that is connected with the first rotary bracket 220 and that includes a first fixing hole 2191 by which the first fixed bracket 210-1 is fixed to the hinge housing 150 and a second fixed bracket 210-2 that is connected with the second rotary bracket 230 and that includes a second fixing hole 2192 by which the second rotary bracket 210-2 is fixed to the hinge housing 150. The first fixed bracket 210-1 and the second fixed bracket 210-2 may be coupled together by inserting (e.g., fitting) a coupling protrusion 2161 protruding from one of the first fixed bracket 210-1 and the second fixed bracket 210-2 into a depression formed in the other. However, without being limited to those illustrated in the drawing, the coupling structures of the first fixed bracket 210-1 and the second fixed bracket 210-2 may include various coupling structures. For example, the first fixed bracket 210-1 and the second fixed bracket 210-2 may be welded to each other.

In an embodiment, the first fixed bracket 210-1 and the second fixed bracket 210-2 may be coupled together to form a predetermined space therebetween. The predetermined space may be formed between the coupling structures (e.g., the coupling protrusions 2161) of the first fixed bracket 210-1 and the second fixed bracket 210-2. Sub-gears 273 and 274 may be disposed in the predetermined space.

Figure 5:
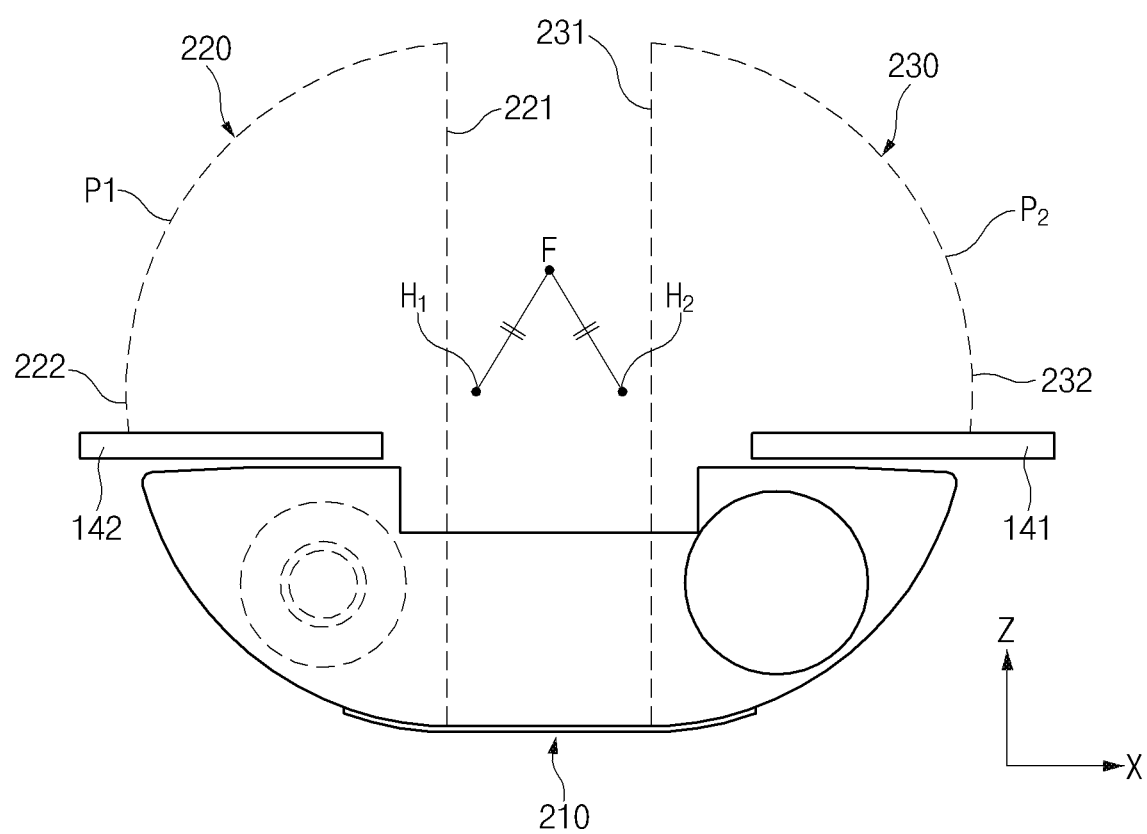
FIG. 5 is a view illustrating hinge axes of the hinge structure of the electronic device according to an embodiment.

FIG. 5 is a view illustrating hinge axes of the hinge structure 200 of the electronic device 100 according to an embodiment.

In an embodiment, a first hinge axis H1 and a second hinge axis H2 may refer to virtual axes about which the first rotary bracket 220 and the second rotary bracket 230 rotate, respectively. The first hinge axis H1 and the second hinge axis H2 may be formed at positions spaced apart from the folding axis F at the same intervals. That is, the first hinge axis H1 and the second hinge axis H2 may be formed at positions that are symmetric to each other with respect to the center line passing through the folding axis F.

In an embodiment, the first hinge axis H1 and the second hinge axis H2 may be formed at positions spaced apart from the fixed bracket 210 by a predetermined distance in the + z-axis direction or at positions spaced apart from the upper surface of a flexible display (e.g., the flexible display 110 of FIG. 2) by a predetermined distance in the + z-axis direction.

In certain embodiments, the first rotary bracket 220 may be rotated about the first hinge axis H1. The first rotary bracket 220 may include a first surface 221 facing the flexible display (e.g., the flexible display 110 of FIG. 2) and a second surface 222 including a curved surface formed to be spaced apart from the first hinge axis H1 by a predetermined distance in the radial direction. For example, the first rotary bracket 220 may be formed in a substantially semi-circular shape.

In an embodiment, the first rotary bracket 220 may rotate about the first hinge axis H1 such that the first surface 221 faces the + z-axis direction in a flat state (e.g., the state illustrated in FIG. 1C) and faces the + x-axis direction in a folded state (e.g., the state illustrated in FIG. 1D). The first surface 221 of the first rotary bracket 220 may be disposed to face a first surface 231 of the second rotary bracket 230 in the folded state (e.g., the state illustrated in FIG. 1D).

In an embodiment, the first rotary bracket 220 may rotate such that the second surface 222 follows a first path P1 spaced apart from the first hinge axis H1 at a predetermined interval. That is, the first path P1 represented by a dotted line in the drawing may be a path having a predetermined radius of curvature from the first hinge axis H1.

In certain embodiments, the second rotary bracket 230 may be rotated about the second hinge axis H2. The second rotary bracket 230 may include the first surface 231 facing the flexible display (e.g., the flexible display 110 of FIG. 2) and a second surface 232 including a curved surface formed to be spaced apart from the second hinge axis H2 by a predetermined distance in the radial direction. For example, the second rotary bracket 230 may be formed in a substantially semi-circular shape.

In an embodiment, the second rotary bracket 230 may rotate about the second hinge axis H2 such that the first surface 231 faces the + z-axis direction in the flat state (e.g., the state illustrated in FIG. 1C) and faces the − x-axis direction in the folded state (e.g., the state illustrated in FIG. 1D). The first surface 231 of the second rotary bracket 230 may be disposed to face the first surface 221 of the first rotary bracket 220 in the folded state (e.g., the state illustrated in FIG. 1D).

In an embodiment, the second rotary bracket 230 may rotate such that the second surface 232 follows a second path P2 spaced apart from the second hinge axis H2 at a predetermined interval. That is, the second path P2 represented by a dotted line in the drawing may be a path having a predetermined radius of curvature from the second hinge axis H2.

Figure 6A:
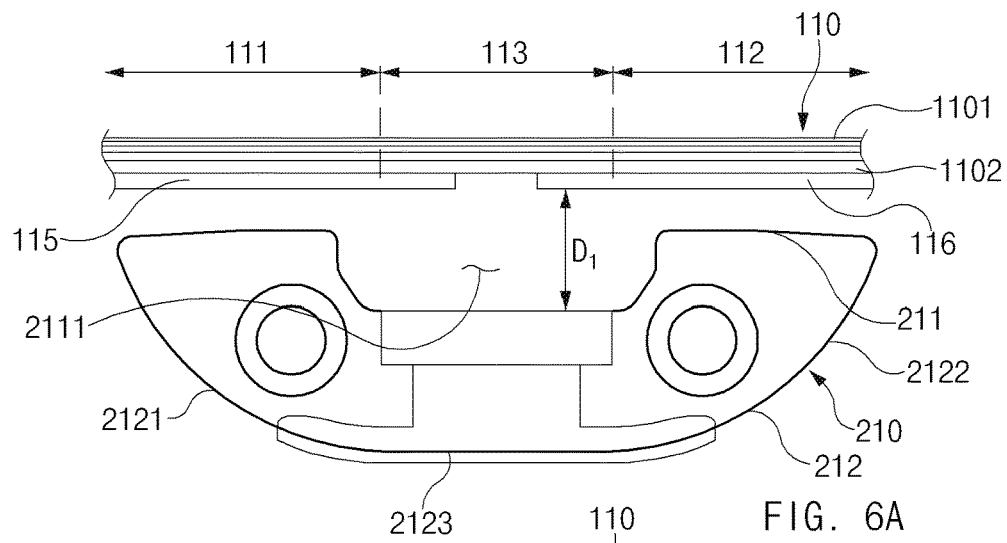
FIGS. 6A to 6C are views illustrating an arrangement of a flexible display and the hinge structure of the electronic device according to an embodiment.
Figure 6B:
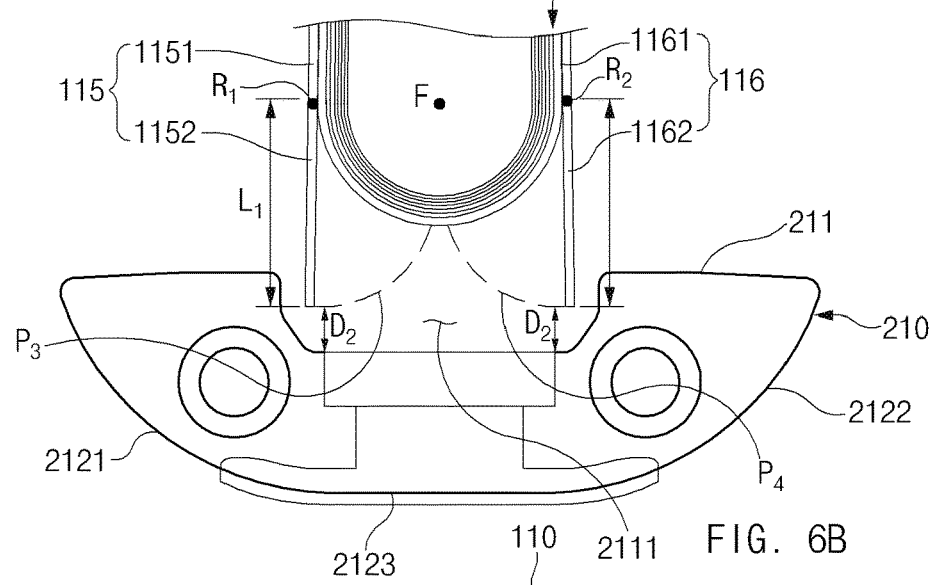
Figure 6C:
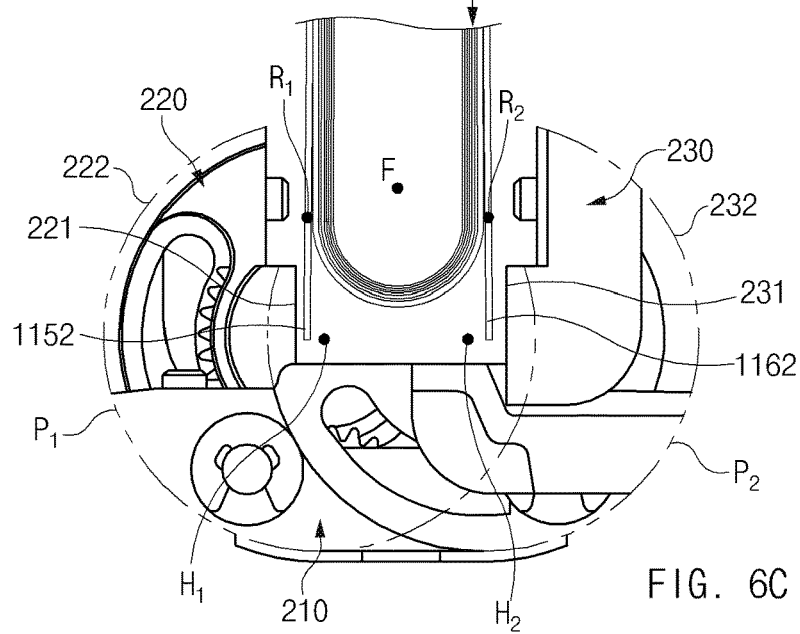

FIGS. 6A to 6C are views illustrating an arrangement of the flexible display 110 and the hinge structure 200 of the electronic device 100 according to an embodiment.

FIG. 6A is a view illustrating the fixed bracket 210 of the hinge structure 200 and the flexible display 110 when the electronic device 100 is in a flat state. FIG. 6B is a view illustrating the fixed bracket 210 of the hinge structure 200 and the flexible display 110 when the electronic device 100 is in a folded state. FIG. 6C is a view illustrating the rotary brackets 220 and 230 of the hinge structure 200 and the flexible display 110 when the electronic device 100 is in the folded state.

In an embodiment, the flexible display 110 may include the first area 111 and the second area 112 that are flat in the flat state and the folded state, and the folding area 113 that is formed between the first area 111 and the second area 112 and that is flat in the flat state and is curved in the folded state.

In an embodiment, the flexible display 110 may include a first surface 1101 that forms the surface of the electronic device 100 in the flat state and a second surface 1102 that is opposite to the first surface 1101. The flexible display 110 may include a plurality of layers formed between the first surface 1101 and the second surface 1102. Metal layers 115 and 116 may be disposed on the second surface 1102 of the flexible display 110. The metal layers 115 and 116 may include the first metal layer 115 extending from the first area 111 to at least part of the folding area 113 and the second metal layer 116 extending from the second area 112 to at least part of the folding area 113. The first metal layer 115 and the second metal layer 116 may be spaced apart from each other at a predetermined interval.

In an embodiment, the first metal layer 115 may include a first attached area 1151 attached to the first area 111 of the flexible display 110 and a first unattached area 1152 that extends from the first attached area 1151 to the folding area 113 in the flat state, but is not attached to the flexible display 110.

In an embodiment, the second metal layer 116 may include a second attached area 1161 attached to the second area 112 of the flexible display 110 and a second unattached area 1162 that extends from the second attached area 1161 to the folding area 113 in the flat state, but is not attached to the flexible display 110.

In an embodiment, the metal layers 115 and 116 may support the second surface 1102 of the flexible display 110 to prevent a deterioration in the quality of the flexible display 110 (e.g., a deterioration in surface quality or distortion) that may occur by repeated folding motions of the flexible display 110.

In an embodiment, the fixed bracket 210 may include a first surface 211 that, in the flat state, faces the metal layers 115 and 116 disposed on the second surface 1102 of the flexible display 110, and a second surface 212 seated on the inside of the hinge housing 150. The first surface 211 may include a recess 2111 concavely formed in the direction toward the inside of the hinge housing 150.

The second surface 212 may include a first curved area 2121 formed of a curved surface having substantially the same curvature as the second surface 222 of the first rotary bracket 220, a second curved area 2122 formed of a curved surface having substantially the same curvature as the second surface 232 of the second rotary bracket 230, and an extension area 2123 extending from the edges of the first curved area 2121 and the second curved area 2122 in the tangential directions. The fixing hole 219 of the fixed bracket 210 may be formed in the extension area 2123.

Referring to FIG. 6A, in the flat state, the bottom surface of the recess 2111 of the fixed bracket 210 may maintain a first interval D1 from the metal layers 115 and 116. Referring to FIG. 6B, in the folded state, the bottom surface of the recess 2111 of the fixed bracket 210 may be spaced apart from the metal layers 115 and 116 at a second interval D2 smaller than the first interval D1.

Referring to FIG. 6B, when viewed with respect to the fixed bracket 210, the first metal layer 115 may rotate about a first boundary line R1 between the first attached area 1151 and the first unattached area 1152. When viewed with respect to the fixed bracket 210, the second metal layer 116 may rotate about a second boundary line R2 between the second attached area 1161 and the second unattached area 1162. At this time, the radius of rotation of the first metal layer 115 and the radius of rotation of the second metal layer 116 may be at least partially formed inside the recess 2111 formed on the fixed bracket 210.

Referring to FIG. 6B, the first unattached area 1152 may extend from the first attached area 1151 toward the first surface 211 of the fixed bracket 210 in the tangential direction of the folding area 113 of the flexible display 110. The second unattached area 1162 may extend from the second attached area 1161 toward the first surface 211 of the fixed bracket 210 in the tangential direction of the folding area 113 of the flexible display 110. In the folded state, at least part of the first unattached area 1152 and at least part of the second unattached area 1162 may be received in the recess 2111 formed on the fixed bracket 210.

Referring to FIG. 6B, the fixed bracket 210 may include the recess 2111, which is formed on part of the first surface 211 of the fixed bracket 210, so as not to make contact with the first unattached area 1152 of the first metal layer 115 and the second unattached area 1162 of the second metal layer 116 that rotate between the flat state and the folded state. Part of a first rotational path P3 of the first unattached area 1152 and part of a second rotational path P4 of the second unattached area 1162 may be formed inside the recess 2111. That is, as compared with when the first surface 211 of the fixed bracket 210 is formed of a flat surface, the recess 2111 may provide a space for rotation of the first unattached area 1152 and the second unattached area 1162 that have larger areas (e.g., greater lengths of L1 and L2).

The fixed bracket 210 of the hinge structure 200 disclosed herein may include the recess 2111 formed on the first surface 211 facing the metal layers 115 and 116, and thus wider support areas by which the metal layers 115 and 116 support the flexible display 110 may be ensured.

Figure 7:
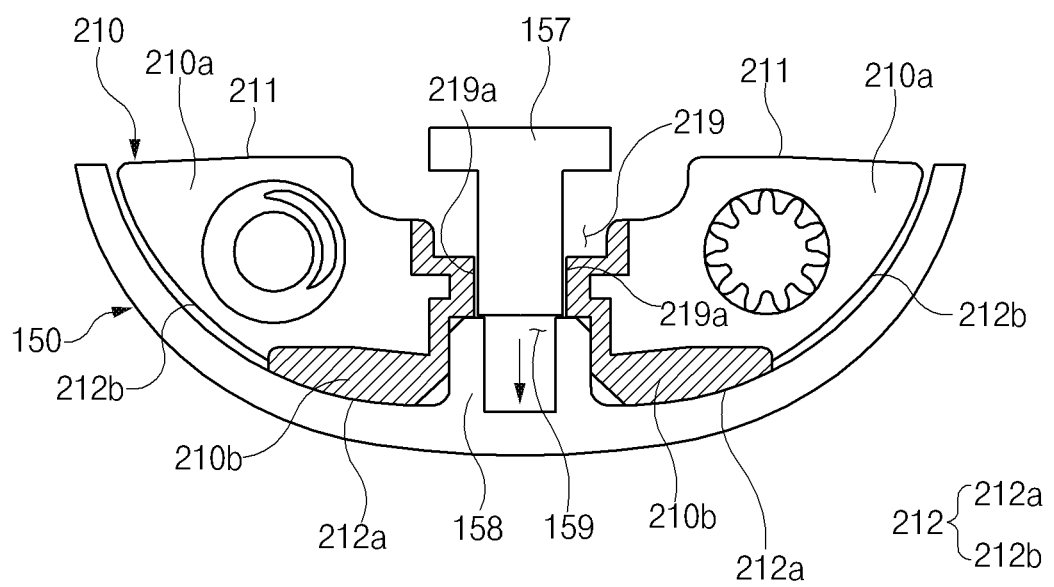
FIG. 7 is a view illustrating a coupling of the hinge structure and a hinge housing according to certain embodiments.

FIG. 7 is a view illustrating a coupling of the hinge structure 200 and the hinge housing 150 according to certain embodiments.

In an embodiment, the hinge structure 200 may include the fixed bracket 210 fixedly disposed on the hinge housing 150. In some embodiments, the hinge structure 200 may include the hinge housing 150 in which the fixed bracket 210 is disposed. In certain embodiments, the hinge housing 150 may be formed of a metallic material. The fixed bracket 210 may include a metal part 210a formed of a metallic material and an insulation part 210b (e.g., the shaded part in the drawing) that is formed of an insulating material.

In an embodiment, the hinge housing 150 may have a protruding boss 158 formed on the inside thereof. The protruding boss 158 may be inserted into the fixing hole 219 of the fixed bracket 210. The protruding boss 158 may be formed in an area corresponding to the insulation part 210b (e.g., a seating area 212a) of the fixed bracket 210. The protruding boss 158 may have a hole 159 into which part of a fastening member 157 is inserted. The hole 159 may have a smaller diameter than the fastening member 157. For example, the fastening member 157 may be inserted into the hole 159 while forming a thread on the inside of the hole 159. In some embodiments, the protruding boss 158 may be disposed on the central axis of the hinge housing 150. Alternatively, the protruding boss 158 may be arranged on the folding axis when viewed from above.

In an embodiment, the fixed bracket 210 may include the first surface 211 facing toward a flexible display (e.g., the flexible display 110 of FIGS. 6A to 6C) and the second surface 212 extending from the first surface 211 and facing the inside of the hinge housing 150. The second surface 212 may include the seating area 212a seated on the inside of the hinge housing 150 and a separation area 212b spaced apart from the inside of the hinge housing 150 at a predetermined interval. The seating area 212a may include part of the extension area 2123 illustrated in FIGS. 6A to 6C.

In an embodiment, the fixed bracket 210 may include the fixing hole 219 into which the protruding boss 158 formed on the hinge housing 150 is inserted, and the fastening member 157 may be inserted into the fixing hole 219. The fixing hole 219 may be aligned with the hole 159 formed in the protruding boss 158 of the hinge housing 150.

In an embodiment, an inner wall 219a of the fixing hole 219 and the seating area 212a may include the insulation part 210b. The insulation part 210b may insulate the metal part of the hinge housing 150 and the metal part 210a of the fixed bracket 210. For example, electricity may be conducted between an electric component in the electronic device 100 and the fixed bracket 210. Due to this, in the case where the connecting portion (e.g., the fixing hole 219) between the fixed bracket 210 and the hinge housing 150 is formed of the metal part 210a, electricity may be conducted to the hinge housing 150 that forms the surface of the electronic device 100, and therefore a user may be exposed to an electric-shock accident. However, the hinge structure 200 disclosed herein may include the fixed bracket 210 in which the coupling structure (e.g., the fixing hole 210) that is coupled with the hinge housing 150 is formed of an insulating material. Accordingly, the hinge structure 200 may prevent electricity from being conducted to at least the surface of the electronic device 100.

In certain embodiments, the insulation part 210b may be formed in a shape substantially corresponding to the shape of the fastening member 157. For example, the insulation part 210b may further include an area on which the head of the fastening member 157 (e.g., a screw head) is seated. In certain embodiments, the insulation part 210b may be formed on the metal part 210a by performing injection molding with an insulating material.

Figure 8:
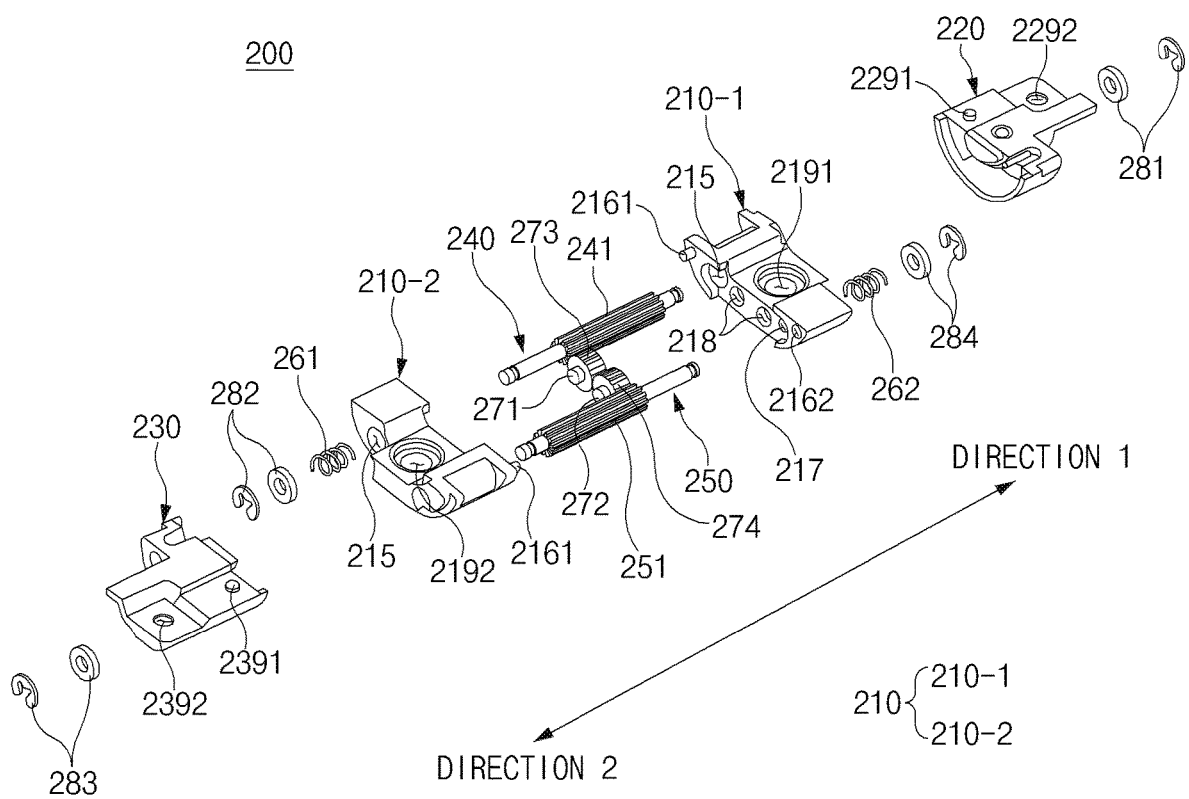
FIG. 8 is an exploded perspective view of the hinge structure according to certain embodiments.

FIG. 8 is an exploded perspective view of the hinge structure 200 according to certain embodiments.

Hereinafter, one of the extension directions of connecting shafts (e.g., a first connecting shaft 240 and a second connecting shaft 250), that is, the right-side direction with respect to the drawing is referred to as a first direction, and the other (that is, the left-side direction with respect to the drawing) is referred to as a second direction.

In an embodiment, the hinge structure 200 may include the fixed bracket 210, the first rotary bracket 220 disposed on one side of the fixed bracket 210 in the first direction, the second rotary bracket 230 disposed on an opposite side of the fixed bracket 210 in the second direction, the first connecting shaft 240 passing through the fixed bracket 210 and the first rotary bracket 220, the second connecting shaft 250 passing through the fixed bracket 210 and the second rotary bracket 230, a first support part 281 and a second support part 282 that are formed on the first connecting shaft 240, a third support part 283 and a fourth support part 284 that are formed on the second connecting shaft 250, a first elastic member 261 supported on the second support part 282, and a second elastic member 262 supported on the fourth support part 284.

In an embodiment, the fixed bracket 210 may include a first through-hole 215 through which the first connecting shaft 240 extends and a second through-hole 217 through which the second connecting shaft 250 extends. The fixed bracket 210 may include a guide structure formed to guide rotation of the rotary brackets 220 and 230. The guide structure may protrude in the first direction to guide the rotation of the first rotary bracket 220 and may protrude in the second direction to guide the rotation of the second rotary bracket 230.

In certain embodiments, the fixed bracket 210 may include the first fixed bracket 210-1 connected with the first rotary bracket 220 and the second fixed bracket 210-2 connected with the second rotary bracket 230. In some embodiments (not illustrated), the fixed bracket 210 may have a space formed therein in which the first sub-gear 273 and the second sub-gear 274 are disposed.

In an embodiment, the first fixed bracket 210-1 may include the coupling protrusion 2161 protruding in a direction (e.g., the second direction) toward the second fixed bracket 210-2. The first fixed bracket 210-1 and the second fixed bracket 210-2 may be coupled together by inserting the coupling protrusion 2161 into a depression (not illustrated) that is formed in the second fixed bracket 210-2. The first fixed bracket 210-1 may have the first fixing hole 2191 formed in the upper surface thereof. A protruding boss formed on the inside of the hinge housing 150 may be inserted into the first fixing hole 2192.

In an embodiment, the second fixed bracket 210-2 may include the coupling protrusion 2161 protruding in a direction (e.g., the first direction) toward the first fixed bracket 210-1. The first fixed bracket 210-1 and the second fixed bracket 210-2 may be coupled together by inserting the coupling protrusion 2161 into a depression 2162 formed in the first fixed bracket 210-1. The second fixed bracket 210-2 may have the second fixing hole 2192 formed in the upper surface thereof. A protruding boss formed on the inside of the hinge housing 150 may be inserted into the second fixing hole 2192.

In an embodiment, the first fixed bracket 210-1 may be disposed on one side of the first rotary bracket 220 in the second direction. The first rotary bracket 220 may include a first fastening protrusion 2291 and/or a first fastening hole 2292 that is formed on the upper surface thereof for connection with a second hinge plate (e.g., the second hinge plate 142 of FIG. 4). The first rotary bracket 220 may be rotated along at least part of a side surface of the first fixed bracket 210-1 that faces the first direction. The first rotary bracket 220 may be formed in a substantially semi-elliptical shape. The first rotary bracket 220 may include an opening through which the first connecting shaft 240 passes and an internal gear formed on the inner wall of the opening and engaged with a first gear 241. The internal gear may be formed in a substantially circular arc shape.

In an embodiment, the second fixed bracket 210-2 may be disposed on one side of the second rotary bracket 230 in the first direction. The second rotary bracket 230 may include a second fastening protrusion 2391 and/or a second fastening hole 2392 that is formed on the upper surface thereof for connection with a first hinge plate (e.g., the first hinge plate 142 of FIG. 4). The second rotary bracket 230 may be rotated along at least part of a side surface of the second fixed bracket 210-2 that faces the second direction. The second rotary bracket 230 may be formed in a substantially semi-circular shape. The second rotary bracket 230 may include an opening through which the second connecting shaft 250 passes and an internal gear formed on the inner wall of the opening and engaged with a second gear 251. The internal gear may be formed in a substantially circular arc shape.

In an embodiment, the first connecting shaft 240 may extend in the first direction. The first connecting shaft 240 may be arranged parallel to the second connecting shaft 250. The first support part 281 may be formed on an end portion of the first connecting shaft 240 that faces the first direction, and the second support part 282 may be formed on an end portion of the first connecting shaft 240 that faces the second direction. The second support part 282, the first elastic member 261, the second fixed bracket 210-2, the first fixed bracket 210-1, the first rotary bracket 220, and the first support part 281 may be sequentially arranged on the first connecting shaft 240 when viewed in the first direction. The first connecting shaft 240 may pass through the first through-hole 215 formed in the fixed bracket 210 and the opening formed in the first rotary bracket 220. The first connecting shaft 240 may be linked with the second connecting shaft 250 to rotate in an opposite direction to the rotational direction of the second connecting shaft 250. The first connecting shaft 240 may include the first gear 241 connected with the second gear 251. The first gear 241 may be formed on at least part of the outer circumferential surface of the first connecting shaft 240. The first gear 241 may be engaged with the second gear 251 through the first sub-gear 273 and the second sub-gear 274 and may rotate in an opposite direction to the rotational direction of the second gear 251.

In an embodiment, the second connecting shaft 250 may extend in the second direction. The second connecting shaft 250 may be arranged parallel to the first connecting shaft 240. The fourth support part 284 may be formed on an end portion of the second connecting shaft 250 that faces the first direction, and the third support part 283 may be formed on an end portion of the second connecting shaft 250 that faces the second direction. The fourth support part 284, the second elastic member 262, the first fixed bracket 210-1, the second fixed bracket 210-2, the second rotary bracket 230, and the third support part 283 may be sequentially arranged on the second connecting shaft 250 when viewed in the second direction. The second connecting shaft 250 may pass through the second through-hole 217 formed in the fixed bracket 210 and the opening formed in the second rotary bracket 230. The second connecting shaft 250 may be linked with the first connecting shaft 240 to rotate in an opposite direction to the rotational direction of the first connecting shaft 240. The second connecting shaft 250 may include the second gear 251 connected with the first gear 241. The second gear 251 may be formed on at least part of the outer circumferential surface of the second connecting shaft 250. The second gear 251 may be engaged with the first gear 241 through the second sub-gear 274 and the first sub-gear 273 and may rotate in an opposite direction to the rotational direction of the first gear 241.

In an embodiment, a first sub-connecting shaft 271 may extend in a direction parallel to the extension directions of the first connecting shaft 240 and the second connecting shaft 250. The first sub-connecting shaft 271 may be disposed in the space between the first fixed bracket 210-1 and the second fixed bracket 210-2. The first sub-connecting shaft 271 may be seated in support recesses 218 formed on facing surfaces of the first fixed bracket 210-1 and the second fixed bracket 210-2. The first sub-connecting shaft 271 may include the first sub-gear 273 formed on the outer circumferential surface thereof. The first sub-gear 273 may be engaged with the first gear 241 and the second sub-gear 274.

In an embodiment, a second sub-connecting shaft 272 may extend in a direction parallel to the extension directions of the first connecting shaft 240 and the second connecting shaft 250. The second sub-connecting shaft 272 may be disposed in the space between the first fixed bracket 210-1 and the second fixed bracket 210-2. The second sub-connecting shaft 272 may be seated in support recesses 218 formed on the facing surfaces of the first fixed bracket 210-1 and the second fixed bracket 210-2. The second sub-connecting shaft 272 may include the second sub-gear 274 formed on the outer circumferential surface thereof. The second sub-gear 274 may be engaged with the second gear 251 and the first sub-gear 273.

In certain embodiments, the first sub-gear 273 and the second sub-gear 274 may be rotated in opposite directions. When the first gear 241 rotates in a first rotational direction, the first sub-gear 273 may rotate in a second rotational direction opposite to the first rotational direction, the second sub-gear 274 may rotate in the first rotational direction, and the second gear 251 may rotate in the second rotational direction. Accordingly, the first connecting shaft 240 and the second connecting shaft 250 may be rotated in the opposite directions.

Figure 9A:
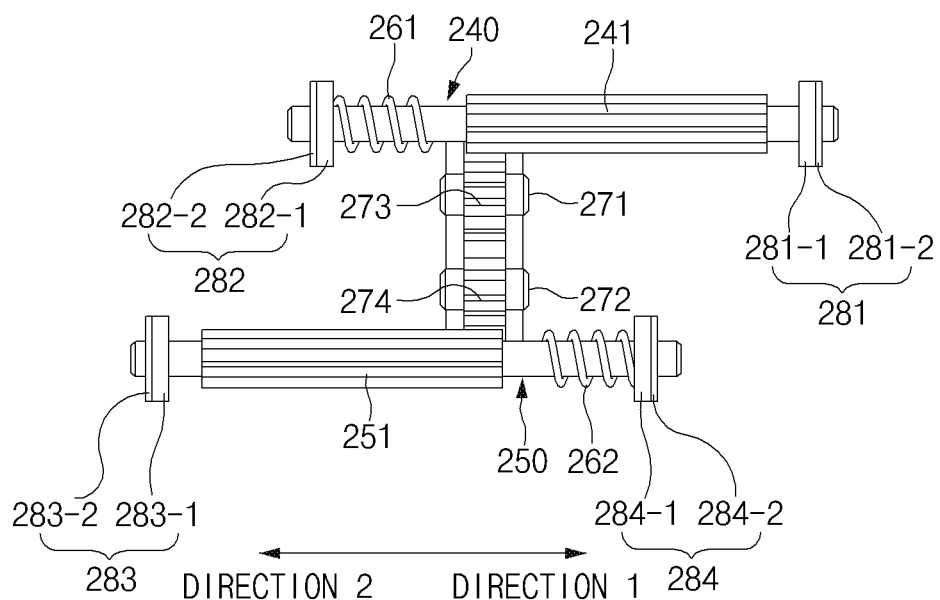
FIGS. 9A and 9B are views illustrating connecting shafts of the hinge structure according to certain embodiments.
Figure 9B:
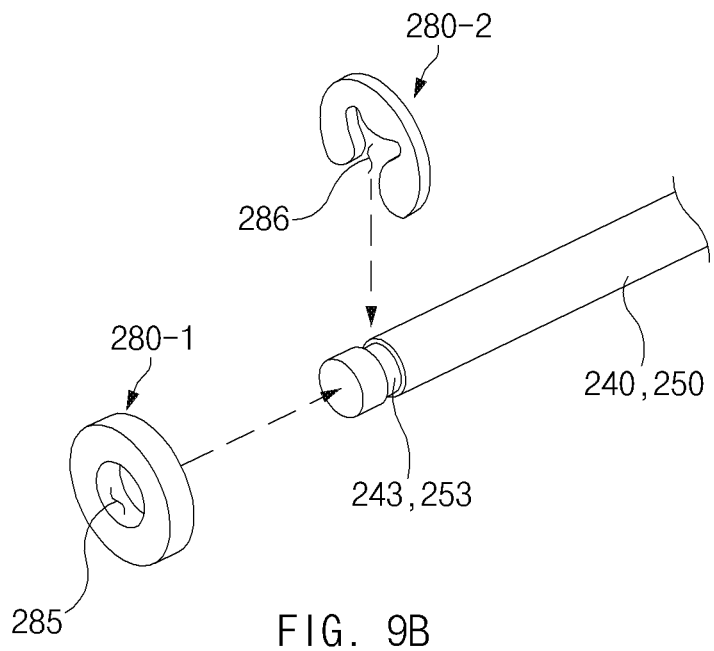

FIGS. 9A and 9B are views illustrating the connecting shafts of the hinge structure 200 according to certain embodiments.

In an embodiment, the first support part 281 may be formed on the end portion of the first connecting shaft 240 that faces the first direction, and the second support part 282 may be formed on the end portion of the first connecting shaft 240 that faces the second direction. The first elastic member 261 may be located on the end portion of the first connecting shaft 240 that faces the second direction. At least part of the first connecting shaft 240 may extend into the first elastic member 261. The first connecting shaft 240 may include the first gear 241 formed between the first elastic member 261 and the first support part 281.

In an embodiment, the first elastic member 261 may be located between the first support part 281 and the second support part 282. The first elastic member 261 may include a coil spring having one side supported by the second support part 282.

In an embodiment, the fourth support part 284 may be formed on the end portion of the second connecting shaft 250 that faces the first direction, and the third support part 283 may be formed on the end portion of the second connecting shaft 250 that faces the second direction. The second elastic member 262 may be located on the end portion of the second connecting shaft 250 that faces the first direction. At least part of the second connecting shaft 250 may extend into the second elastic member 262. The second connecting shaft 250 may include the second gear 251 formed between the second elastic member 262 and the third support part 283.

In an embodiment, the second elastic member 262 may be located between the third support part 283 and the fourth support part 284. The second elastic member 262 may include a coil spring having one side supported by the fourth support part 284.

For example, the first support part 281 may include a first washer member 281-1 facing toward the first gear 241 and a first fixing member 281-2 for supporting the first washer member 281-1 in the second direction. That is, the first fixing member 281-2 may apply a reaction force to the first washer member 281-1 in the second direction to prevent the first washer member 281-1 from being separated from the first connecting shaft 240 to the outside through the end portion of the first connecting shaft 240 that faces the first direction.

For example, the second support part 282 may include a second washer member 282-1 facing toward the first gear 241 and a second fixing member 282-2 for supporting the second washer member 282-1 in the first direction. That is, the second fixing member 282-2 may apply a reaction force to the second washer member 282-1 in the first direction to prevent the second washer member 282-1 from being separated from the first connecting shaft 240 to the outside through the end portion of the first connecting shaft 240 that faces the second direction. The first elastic member 261 may be supported on the second washer member 282-1 of the second support part 282.

For example, the third support part 283 may include a third washer member 283-1 facing toward the second gear 251 and a third fixing member 283-2 for supporting the third washer member 283-1 in the first direction. That is, the third fixing member 283-2 may apply a reaction force to the third washer member 283-1 in the first direction to prevent the third washer member 283-1 from being separated from the second connecting shaft 250 to the outside through the end portion of the second connecting shaft 250 that faces the second direction.

For example, the fourth support part 284 may include a fourth washer member 284-1 facing toward the second gear 251 and a fourth fixing member 284-2 for supporting the fourth washer member 284-1 in the second direction. That is, the fourth fixing member 284-2 may apply a reaction force to the fourth washer member 284-1 in the second direction to prevent the fourth washer member 284-1 from being separated from the second connecting shaft 250 to the outside through the end portion of the second connecting shaft 250 that faces the first direction. The second elastic member 262 may be supported on the fourth washer member 284-1 of the fourth support part 284.

Referring to FIG. 9B, each of the support parts 281, 282, 283, and 284 may include a washer member 280-1 and a fixing member 280-2 for fixing the position of the washer member 280-1. The washer member 280-1 may be formed in a ring shape, and the connecting shaft 240 or 250 may extend into the washer member 280-1. The position of the washer member 280-1 may be fixed by the fixing member 280-2. The washer member 280-1 may be disposed in a direction toward the gear 241 or 251. The washer member 280-1 may be formed in a ring shape including a first opening 285 that has a diameter corresponding to the diameter of the connecting shaft 240 or 250.

Referring to FIG. 9B, the connecting shaft 240 or 250 may have, on opposite end portions thereof, grooves 243 and 253 in which the fixing members 280-2 are disposed. The grooves 243 and 253 may have a smaller diameter than the connecting shaft 240 or 250. The fixing members 280-2 may be disposed in the grooves 243 and 253. The fixing members 280-2 may include a second opening 286 that is open at one side and that has a diameter substantially corresponding to the diameter of the grooves 243 and 253 and smaller than the diameter of the connecting shaft 240 or 250. The length of the fixing members 280-2 in the direction of the connecting shaft 240 or 250 may be substantially the same as the length of the grooves 243 and 253 in direction of the connecting shaft 240 or 250. The fixing members 280-2 may be inserted into the grooves 243 and 253 in a direction perpendicular to the connecting shaft 240 or 250. Accordingly, each of the fixing members 280-2 may be supported between the inner walls of a corresponding one of the grooves 243 and 253 to fix the position of the washer member 280-1.

Figure 10A:
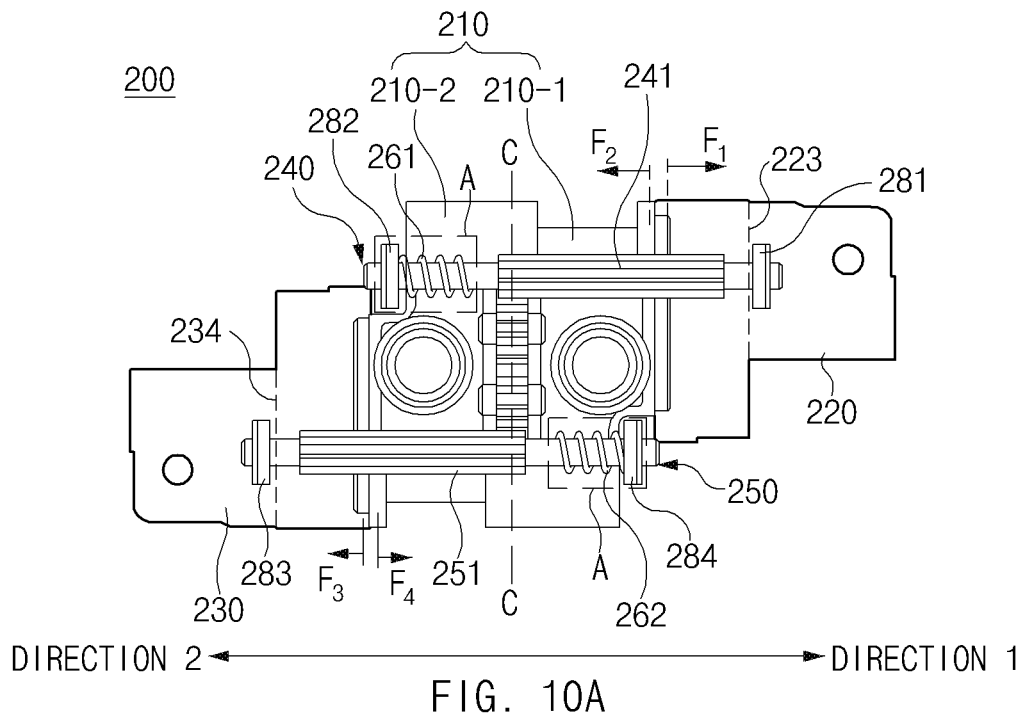
FIGS. 10A and 10B are views illustrating forces acting on a fixed bracket and rotary brackets of the hinge structure in the directions of the connecting shafts according to certain embodiments.
Figure 10B:
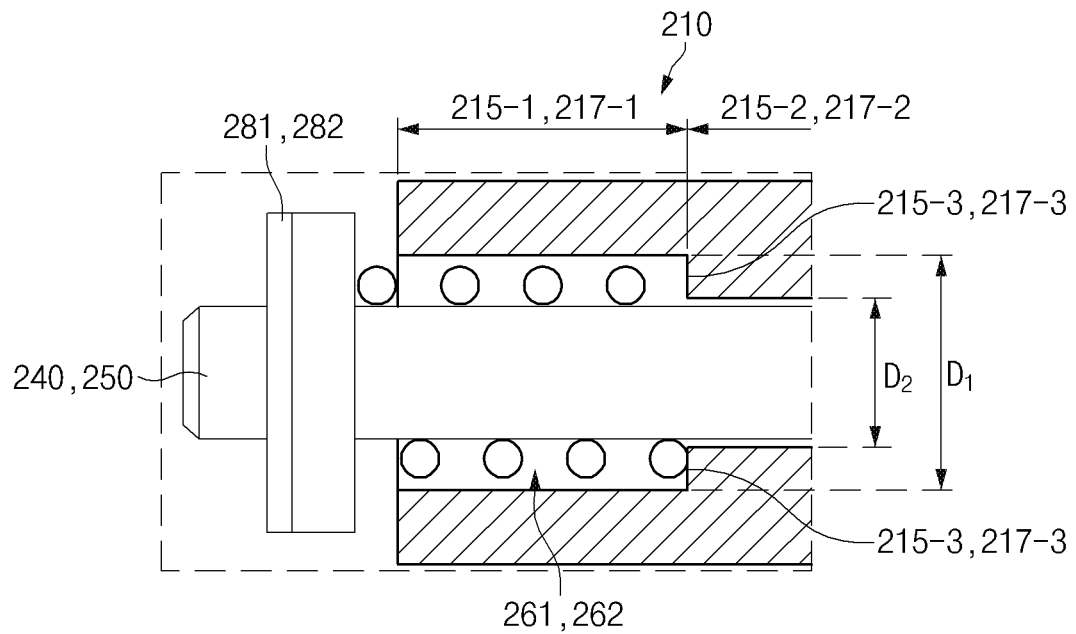

FIGS. 10A and 10B are views illustrating forces acting on the fixed bracket 210 and the rotary brackets 220 and 230 of the hinge structure 200 in the directions of the connecting shafts according to certain embodiments.

In an embodiment, the first connecting shaft 240 may extend in the first direction to pass through the second fixed bracket 210-2, the first fixed bracket 210-1, and the first rotary bracket 220. The second fixed bracket 210-2, the first fixed bracket 210-1, and the first rotary bracket 220 may be disposed between the first support part 281 and the second support part 282. The first gear 241 may be located in the first fixed bracket 210-1 and the first rotary bracket 220, among the areas through which the first connecting shaft 240 passes. At least part of the first elastic member 261 may be located in the second fixed bracket 210-2, among the areas through which the first connecting shaft 240 passes.

In an embodiment, the second connecting shaft 250 may extend in the second direction to pass through the first fixed bracket 210-1, the second fixed bracket 210-2, and the second rotary bracket 230. The first fixed bracket 210-1, the second fixed bracket 210-2, and the second rotary bracket 230 may be disposed between the third support part 283 and the fourth support part 284. The second gear 251 may be located in the second fixed bracket 210-2 and the second rotary bracket 230, among the areas through which the second connecting shaft 250 passes. At least part of the second elastic member 262 may be located in the first fixed bracket 210-1, among the areas through which the second connecting shaft 250 passes.

In an embodiment, the first sub-gear 273 and the second sub-gear 274 may be disposed between the first fixed bracket 210-1 and the second fixed bracket 210-2.

Referring to FIG. 10B, the fixed bracket 210 may have the through-holes 215 and 217 formed therein in which the connecting shafts 240 and 250 are disposed. The through-holes 215 and 217 may include first portions 215-1 and 217-1 having a first diameter D1 larger than the diameter of the connecting shafts 240 and 250 and second portions 215-2 and 217-2 having a second diameter D2 smaller than the first diameter D1. The second diameter D2 may substantially correspond to the diameter of the connecting shafts 240 and 250. The second portions 215-2 and 217-2 may be connected to sides of the first portions 215-1 and 217-1 that face the first direction. At least parts of the elastic members 261 and 262 may be disposed in the first portions 215-1 and 217-1. Steps 215-3 and 217-3 may be formed between the first portions 215-1 and 217-1 and the second portions 215-2 and 217-2 that have different diameters. The steps 215-3 and 217-3 may protrude toward the insides of the through-holes 215 and 217 when viewed in the first direction.

Referring again to FIG. 10A, one side of the first elastic member 261 may be supported by the second support part 282, and an opposite side of the first elastic member 261 may press the step 215-3 formed in the first through-hole 215 of the second fixed bracket 210-2. That is, the first elastic member 261 may be disposed between the second support part 282 and the first step 215-3 in a compressed state to press the fixed bracket 210 in the direction (e.g., the first direction) toward the first rotary bracket 220. Furthermore, the first elastic member 261 may be supported on the first step 215-3 to pull the first connecting shaft 240 in the second direction. The first support part 281 provided on the end portion of the first connecting shaft 240 may press the first rotary bracket 220 in the direction (e.g., the second direction) toward the fixed bracket 210.

In an embodiment, a first side surface 223 of the first rotary bracket 220 that faces the first direction may be supported by the first support part 281. When the first rotary bracket 220 is pressed by the first elastic member 261 in the first direction, the first support part 281, the position of which is fixed in the axial direction, may press the first side surface 223 in the second direction. That is, the first support part 281 may apply, in the opposite direction, a reaction force having the same magnitude as the force acting on the first rotary bracket 220. The elastic force F1 of the first elastic member 261 and the reaction force F2 of the first support part 281 that act in the opposite directions may be formed between the first rotary bracket 220 and the fixed bracket 210. The elastic force F1 and the reaction force F2 may fix the positions of the first rotary bracket 220 and the fixed bracket 210 in the axial direction. Accordingly, the first rotary bracket 220 may be firmly coupled to the fixed bracket 210 even when an external impact is applied. In some embodiments, the first fixed bracket 210-1 may be integrally formed with the second fixed bracket 210-2, or may be coupled (e.g., welded) to the second fixed bracket 210-2 to form one rigid body. Therefore, the forces acting between the first fixed bracket 210-1 and the second fixed bracket 210-2 may be understood as internal forces.

Referring again to FIG. 10A, one side of the second elastic member 262 may be supported by the fourth support part 284, and an opposite side of the second elastic member 262 may press the step 217-3 formed in the second through-hole 217 of the first fixed bracket 210-1. That is, the second elastic member 262 may be disposed between the fourth support part 284 and the step 217-3 in a compressed state to press the fixed bracket 210 in the direction (e.g., the second direction) toward the second rotary bracket 230. Furthermore, the second elastic member 262 may be supported on the second step 217-3 to pull the second connecting shaft 250 in the first direction. The third support part 283 provided on the end portion of the second connecting shaft 250 may press the second rotary bracket 230 in the direction (e.g., the first direction) toward the fixed bracket 210.

In an embodiment, a second side surface 234 of the second rotary bracket 230 that faces the second direction may be supported by the third support part 283. When the second rotary bracket 230 is pressed by the second elastic member 262 in the second direction, the third support part 283, the position of which is fixed in the axial direction, may press the second side surface 234 in the first direction. That is, the third support part 283 may apply, in the opposite direction, a reaction force having the same magnitude as the force acting on the second rotary bracket 230. The elastic force F3 of the second elastic member 262 and the reaction force F4 of the third support part 283 that act in the opposite directions may be formed between the second rotary bracket 230 and the fixed bracket 210. The elastic force F3 and the reaction force F4 may fix the positions of the second rotary bracket 230 and the fixed bracket 210 in the axial direction. Accordingly, the second rotary bracket 230 may be firmly coupled to the fixed bracket 210 even when an external impact is applied. In some embodiments, the first fixed bracket 210-1 may be integrally formed with the second fixed bracket 210-2, or may be coupled (e.g., welded) to the second fixed bracket 210-2 to form one rigid body. Therefore, the forces acting between the first fixed bracket 210-1 and the second fixed bracket 210-2 may be understood as internal forces.

In certain embodiments, the elastic member 261 or 262 may be disposed on one side of the axial center line C of the hinge structure 200, and the axial pressure formed by the elastic member 261 or 262 may be formed on an opposite side of the axial center line C. For example, the first elastic member 261 may be disposed on the left side of the center line C and may form surface pressure between the rotary bracket (e.g., the first rotary bracket 220) that is located on the right side of the center line C and the fixed bracket 210. For example, the second elastic member 262 may be disposed on the right side of the center line C and may form surface pressure between the rotary bracket (e.g., the second rotary bracket 230) that is located on the left side of the center line C and the fixed bracket 210.

Figure 11:
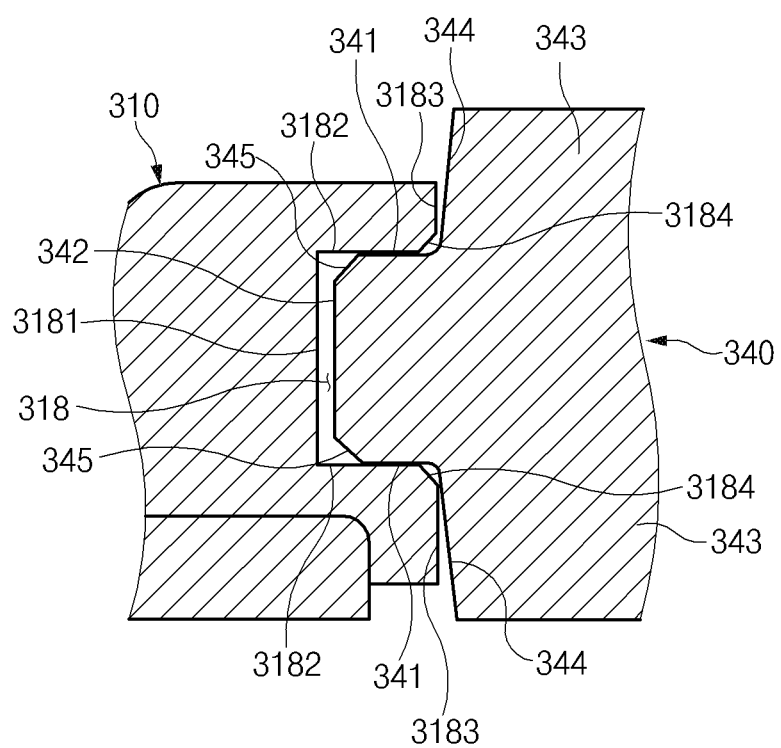
FIG. 11 is a view illustrating a contact surface of a fixed bracket and a gear of the hinge structure according to certain embodiments.

FIG. 11 is a view illustrating a contact surface of a fixed bracket 310 and a gear of the hinge structure 200 according to certain embodiments. FIG. 11 is a sectional view of portion C illustrated in FIG. 10A.

Referring to FIG. 11, at least part of a sub-connecting shaft 340 (e.g., the sub-connecting shaft 271 or 272 of FIG. 8) may be inserted into a support recess 318 formed on the fixed bracket 310 (e.g., the fixed bracket 210 of FIG. 8) such that rotation of the sub-connecting shaft 340 is supported. An end surface 342 of the sub-connecting shaft 340 may be spaced apart from a bottom surface 3181 of the support recess 318 at a predetermined interval. A sub-gear 343 (e.g., the sub-gear 273 or 274 of FIG. 8) may be formed on an area of the outer circumferential surface 341 of the sub-connecting shaft 340 that is not inserted into the support recess 318. The sub-gear 343 may include a facing surface 344 that faces a surrounding area 3182 of the support recess 318 of the fixed bracket 310. A first inclined area 345 may be formed between the end surface 342 of the sub-connecting shaft 340 and the outer circumferential surface 341 of the sub-connecting shaft 340. The first inclined area 345 may be formed to be inclined toward the central axis of the sub-connecting shaft 340 to decrease the diameter of the sub-connecting shaft 340.

Referring to FIG. 11, the support recess 318 may be formed on the fixed bracket 310. The support recess 318 may include the bottom surface 3181 and an inner wall 3182. The bottom surface 3181 may face the end surface 342 of the sub-connecting shaft 340. The inner wall 3182 may face the outer circumferential surface 341 of the sub-connecting shaft 340. The surrounding area 3183 of the support recess 318 of the fixed bracket 310 may face the facing surface 344 of the sub-gear 343. A second inclined area 3184 may be formed between the inner wall 3182 of the support recess 318 and the surrounding area 3183 of the support recess 318. The second inclined area 3184 may be formed to be inclined toward the outside of the support recess 318 such that the diameter of the support recess 318 is increased with an approach to the surrounding area 3183. The second inclined area 3184 may be formed by a chamfering process.

In certain embodiments, the sub-connecting shaft 340 may be inserted into the support recess 318 such that the facing surface 344 of the sub-gear 343 makes line contact with the surrounding area 3183 of the support recess 318. For example, the normal vector of the facing surface 344 of the sub-gear 343 may form a predetermined angle rather than 180 degrees with the normal vectors of the surrounding area 3183 and the second inclined area 3184 of the support recess 318. For example, the sub-gear 343 may rotate relative to the surrounding area 3183 of the support recess 318, and shear stress may be formed between the facing surface 344 of the sub-gear 343 and the surrounding area 3183 of the support recess 318. In the case where the facing surface 344 of the sub-gear 343 and the surrounding area 3183 of the support recess 318 make surface-to-surface contact with each other (e.g., when the normal vector of the surrounding area 3183 and the normal vector of the facing surface 344 form an angle of 180 degrees therebetween), the shear stress may cause the sub-gear 343 and the fixed bracket 310 to be worn and may generate noise.

Accordingly, the fixed bracket 310 and the sub-gear 343 may be formed such that the surrounding area 3183 of the support recess 318 and the facing surface 344 of the sub-gear 343 linearly contact with each other as described above, and thus the noise and the wear of the surrounding area 3183 of the support recess 318 and the facing surface 344 of the sub-gear 343 may be reduced.

In an embodiment, the sub-connecting shaft 340 may be inserted into the support recess 318 such that the end surface 342 is spaced apart from the bottom surface 3181 of the support recess 318 at a predetermined interval. That is, the support recess 318 may be formed to have a depth greater than the axial length of the insertion portion of the sub-connecting shaft 340 (e.g., the area on which the sub-gear 343 is not formed) that is inserted into the support recess 318. Because the end surface 342 of the sub-connecting shaft 340 does not make contact with the bottom surface 3181 of the support recess 318, friction noise and wear of the support recess 318 caused by rotation of the sub-connecting shaft 340 may be prevented.

In an embodiment, the outer circumferential surface 341 of the sub-connecting shaft 340 may be brought into contact with the inner wall 3182 of the support recess 318. In this case, the contact area between the sub-connecting shaft 340 and the support recess 318 may be reduced because the sub-connecting shaft 340 and the support recess 318 include the inclined areas 345 and 3184, respectively. Accordingly, friction noise and wear of the support recess 318 caused by rotation of the sub-connecting shaft 340 may be reduced.

Although the line contact structure of the sub-gear 343 and the sub-connecting shaft 340 is illustrated in FIG. 11, the disclosure is not necessarily limited thereto, and the line contact structure may also be applied to a first gear (e.g., the first gear 241 of FIG. 8) and a second gear (e.g., the second gear 251 of FIG. 8). For example, a connecting shaft (e.g., 240 or 250 of FIG. 8) on which a gear (e.g., 241 or 251 of FIG. 8) is formed may be referred to as the sub-connecting shaft 340, and a through-hole (e.g., 215 or 217 of FIG. 8) that supports the connecting shaft (e.g., 240 or 250 of FIG. 8) may be referred to as the support recess 318.

Figure 12A:
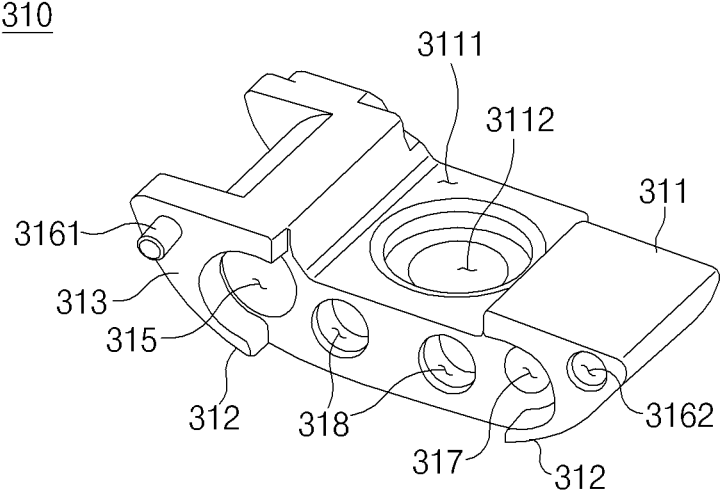
FIGS. 12A and 12B are views illustrating the fixed bracket of the hinge structure according to certain embodiments.
Figure 12B:
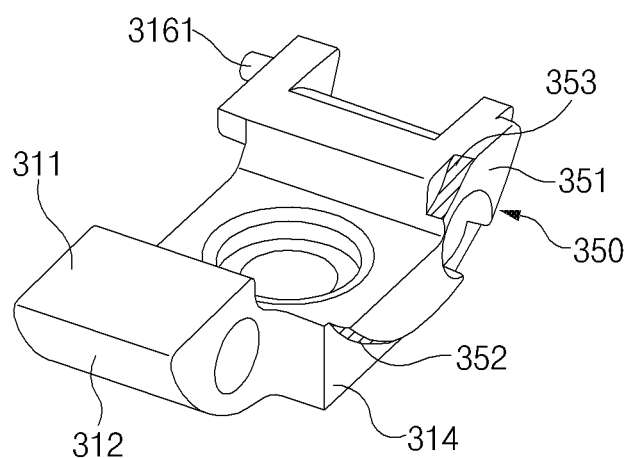

FIGS. 12A and 12B are views illustrating the fixed bracket 310 of the hinge structure 200 according to certain embodiments.

In an embodiment, the fixed bracket 310 (e.g., the fixed bracket 210 of FIG. 8) may include a first surface 311 in which a fixing hole 3112 is formed, a second surface 312 that is opposite to the first surface 311 and that includes a curved surface, a first side surface 313 in which through-holes 315 and 317 (e.g., the first through-hole 215 and the second through-hole 217 of FIG. 8) and support recesses 318 (e.g., the support recesses 218 of FIG. 8) are formed, and a second side surface 314 in which the through-holes 315 and 317 (e.g., the first through-hole 215 and the second through-hole 217 of FIG. 8) are formed and on which a first guide structure 350 is formed. The fixed bracket 310 may be formed in a substantially semi-elliptical shape. A recess 3111 may be formed on the first surface 311. Parts of rotational paths (e.g., P3 and P4 of FIGS. 6A to 6C) of metal layers (e.g., the metal layers 115 and 116 of FIGS. 6A to 6C) of a flexible display (e.g., the flexible display 110 of FIGS. 6A to 6C) may be formed in the recess 3111 as described above with reference to FIGS. 6A to 6C. The fixing hole 3112 (e.g., the fixing hole 219 of FIG. 7) may be formed in the recess 3111. An insulating material may be formed on the inner wall of the fixing hole 3112.

In an embodiment, the fixed bracket 310 may include the through-holes 315 and 317 formed through the first side surface 313 and the second side surface 314. Connecting shafts (e.g., the first connecting shaft 240 and the second connecting shaft 250 of FIGS. 10A and 10B) may extend into the through-holes 315 and 317. The support recesses 318 may be formed on the first side surface 313 so as to be located between the through-holes 315 and 317. A coupling protrusion 3161 and a coupling recess 3162 corresponding to the coupling protrusion 3161 may be formed on the first side surface 313. For example, the coupling protrusion 3161 of the first fixed bracket 310 may be inserted into the coupling recess 3162 of the second fixed bracket 310, and the coupling protrusion 3161 of the second fixed bracket 310 may be inserted into the coupling recess 3162 of the first fixed bracket 310. Accordingly, the first fixed bracket 310 and the second fixed bracket 310 may be coupled such that the first side surfaces 313 thereof face each other.

In an embodiment, the first guide structure 350 may be formed on the second side surface 314 of the fixed bracket 310. The first guide structure 350 may include a protruding surface 351 facing the axial direction, a first guide surface 352 in a circular arc shape that has a first radius of curvature from the hinge axis, and a second guide surface 353 that has a second radius of curvature, which is smaller than the first radius of curvature, from the hinge axis.

Figure 13A:
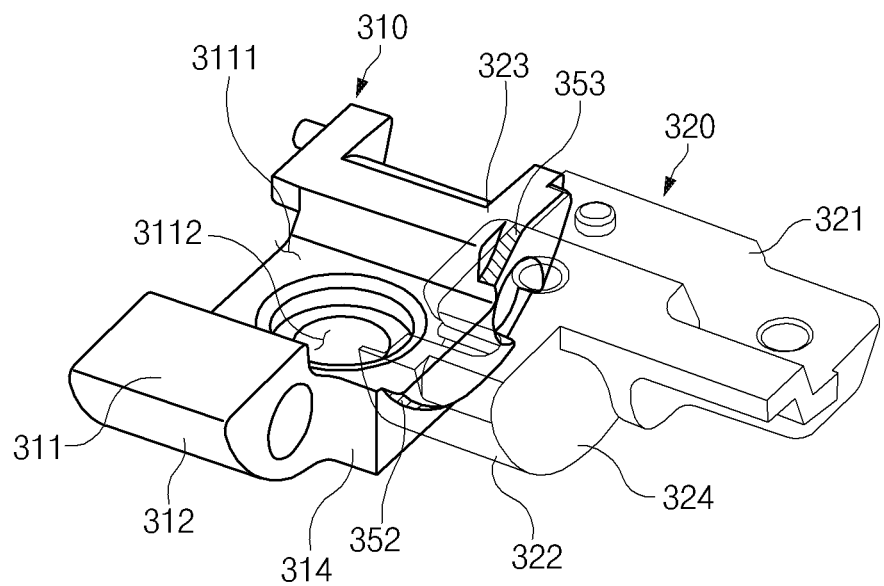
FIGS. 13A and 13B are views illustrating a coupling of the fixed bracket and a rotary bracket of the hinge structure according to certain embodiments.
Figure 13B:
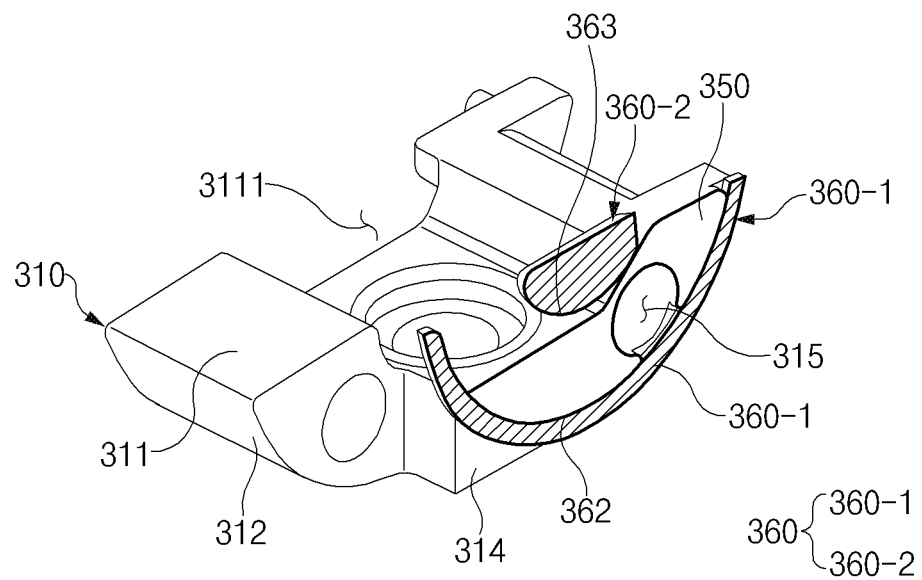

FIGS. 13A and 13B are views illustrating a coupling of the fixed bracket 310 and a rotary bracket 320 of the hinge structure 200 according to certain embodiments.

In an embodiment, the rotary bracket 320 (e.g., the first rotary bracket 220 or the second rotary bracket 230 of FIG. 8) may include a first surface 321 to which a hinge plate (e.g., the hinge plate 141 or 142 of FIG. 4) is fastened, a second surface 322 that is opposite to the first surface 321 and that includes a circular arc surface, a first side surface 323 facing toward the fixed bracket 310 (e.g., the fixed bracket 210 of FIG. 8), and a second side surface 324 that is opposite to the first side surface 323. The second side surface 324 of the rotary bracket 320 may be supported by a support part (e.g., the first support part 281 or the third support part 283 of FIGS. 10A and 10B).

In an embodiment, the first side surface 323 of the rotary bracket 320 may face the second side surface 314 of the fixed bracket 310. A second guide structure 360 may be formed on the first side surface 323 of the rotary bracket 320. The second guide structure 360 may be shape-coupled with the first guide structure 350 of the fixed bracket 310. The second guide structure 360 of the rotary bracket 320 may include a first portion 360-1 including a first corresponding guide surface 362 that makes contact with the first guide surface 352 of the first guide structure 350 of the fixed bracket 310 and a second portion 360-2 including a second corresponding guide surface 363 that makes contact with the second guide surface 353 of the first guide structure 350 of the fixed bracket 310. Each of the first corresponding guide surface 362 and the second corresponding guide surface 363 may be formed of a circular arc surface with the hinge axis as the center thereof. The first corresponding guide surface 362 may be supported by the first guide surface 352, and the second corresponding guide surface 363 may be supported by the second guide surface 353. Accordingly, the rotary bracket 320 may rotate relative to the fixed bracket 310.

In certain embodiments, the contact area between the second guide surface 353 of the fixed bracket 310 and the second corresponding guide surface 363 of the rotary bracket 320 may be smaller than the contact area between the first guide surface 352 and the first corresponding guide surface 362. The second guide surface 353 may make contact with part of the second corresponding guide surface 363 of the rotary bracket 320.

In certain embodiments, the first guide structure 350 may be formed such that the second guide surface 353 is not located in the recess 3111. In the case where the second guide surface 353 has an area corresponding to the second corresponding guide surface 363, the first guide structure 350 may be formed in the recess 3111 of the fixed bracket 310. In this case, a metal layer (e.g., the metal layer 115 of FIGS. 6A to 6C) and the second guide surface 353 may collide with each other when a flexible display (e.g., the flexible display 110 of FIGS. 6A to 6C) is folded. Accordingly, the second guide surface 353 may be formed to support part of the second corresponding guide surface 363.

Figure 14A:
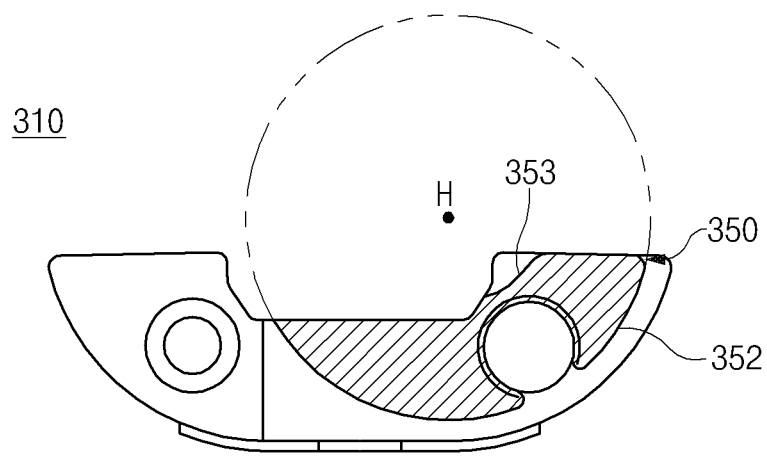
FIGS. 14A and 14B are views illustrating a rotation guide structure of the hinge structure according to certain embodiments.
Figure 14B:
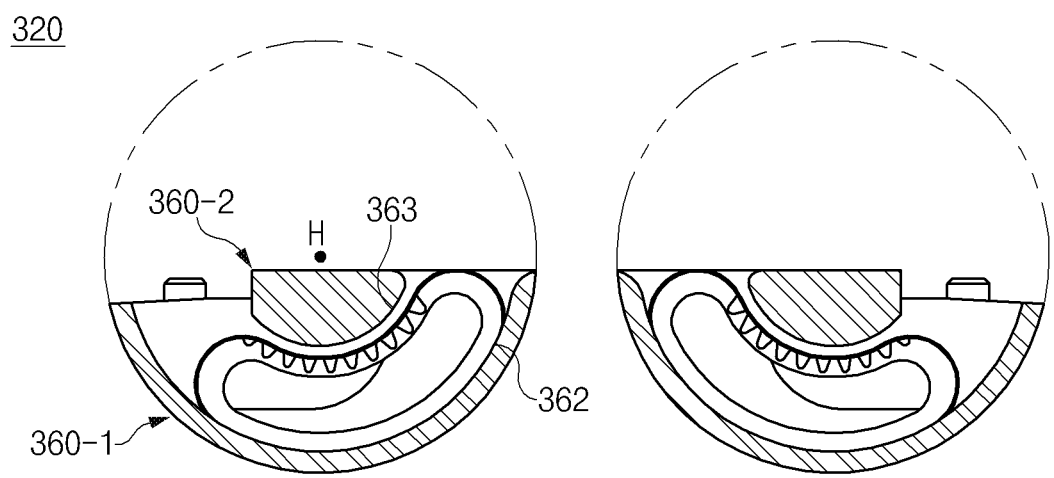

FIGS. 14A and 14B are views illustrating a rotation guide structure of the hinge structure 200 according to certain embodiments.

In an embodiment, the rotary bracket 320 may be coupled to the fixed bracket 310 so as to be rotatable about the hinge axis relative to the fixed bracket 310. With respect to the drawing, the rotary bracket 320 illustrated in the drawing may be coupled to be superimposed on the fixed bracket 310 illustrated in the drawing.

In an embodiment, the first guide surface 352 of the first guide structure 350 of the fixed bracket 310 may make contact with the first corresponding guide surface 362 of the second guide structure 360 of the rotary bracket 320. The second guide surface 353 of the first guide structure 350 of the fixed bracket 310 may make contact with the second corresponding guide surface 363 of the second guide structure 360 of the rotary bracket 320. The first guide structure 350 of the fixed bracket 310 may be disposed between the first portion 360-1 and the second portion 360-2 of the second guide structure 360 of the rotary bracket 320.

Figure 15A:
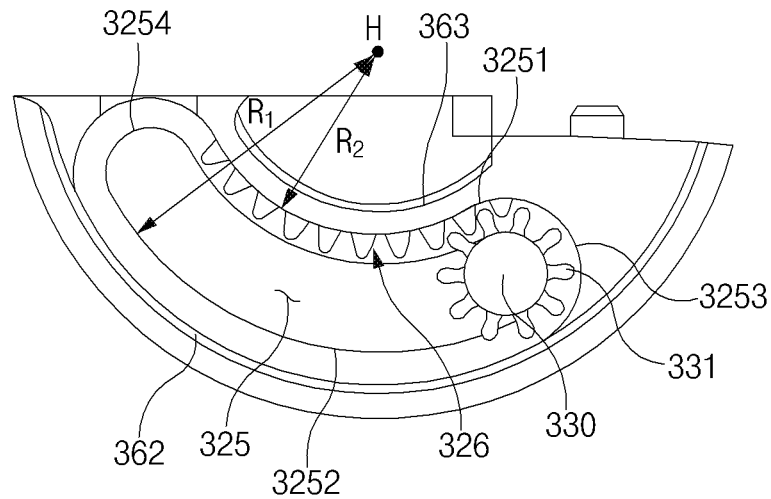
FIGS. 15A and 15B are views illustrating engagement of an internal gear of the rotary bracket and a gear of a connecting shaft in the hinge structure according to certain embodiments.
Figure 15B:
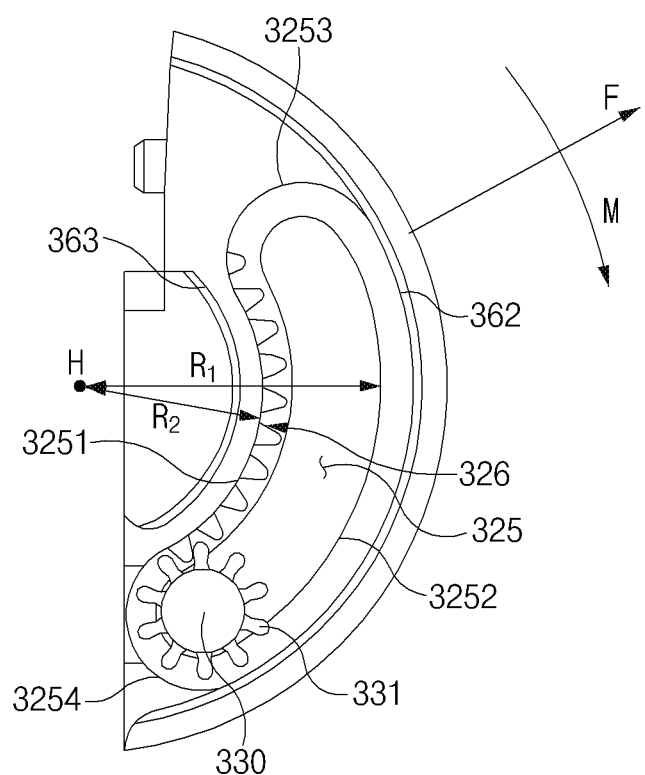

FIGS. 15A and 15B are views illustrating engagement of an internal gear 326 of the rotary bracket 320 and a gear 331 of a connecting shaft 330 in the hinge structure 200 according to certain embodiments.

In certain embodiments, the rotary bracket 320 (e.g., the first rotary bracket 220 or the second rotary bracket 230 of FIG. 8) may include an opening 325 in a circular arc shape that has a predetermined radius of curvature from a hinge axis H. The connecting shaft 330 (e.g., the first connecting shaft 241 or the second connecting shaft 251 of FIG. 8) may pass through the opening 325. The inner walls of the opening 325 may include the first region 3251 having a first radius of curvature R1 from the hinge axis H, the second region 3252 having a second radius of curvature R2 smaller than the first radius of curvature R1, and the end regions 3253 and 3254 connecting the first region 3251 and the second region 3252. The first region 3251 and the second region 3252 may be formed between the first corresponding guide surface 362 and the second corresponding guide surface 363. The curvatures of the first region 3251 and the second region 3252 may be the same as the curvatures of the first corresponding guide surface 362 and the second corresponding guide surface 363. The end regions 3253 and 3254 may include the first end region 3253 in which the gear 331 of the connecting shaft 330 is disposed in a flat state and the second end region 3254 in which the gear 331 (e.g., the first gear 241 or the second gear 251 of FIG. 8) of the connecting shaft 330 is disposed in a folded state.

In certain embodiments, the rotary bracket 320 may include the internal gear 326 formed on the second region 3252 among the inner walls and engaged with the gear 331 of the connecting shaft 330. The internal gear 326 may include gear teeth corresponding to the gear teeth of the gear 331 of the connecting shaft 330 so as to be engaged with the gear 331 of the connecting shaft 330. The rotary bracket 320 may rotate about the hinge axis H while the gear teeth of the internal gear 326 are engaged with the gear teeth of the gear 331 of the connecting shaft 330.

Referring to FIG. 15, the internal gear 326 may be formed between the hinge axis H and the connecting shaft 330 when viewed in the radial direction with respect to the hinge axis H. Accordingly, the gear 331 of the connecting shaft 330 may be prevented from being separated from the internal gear 326 when the rotary bracket 320 moves from the folded state to the flat state (M). For example, when the rotary bracket 320 moves from the folded stat to the flat state, an external force F may act on the rotary bracket 320 in the radially outward direction with respect to the hinge axis H. In the case where the internal gear 326 is located outward of the connecting shaft 330 (e.g., the connecting shaft 330 is located between the internal gear 326 and the hinge axis H) when viewed in the radial direction with respect to the hinge axis H, the internal gear 326 may be moved in the radially outward direction by the external force and may be separated from the gear 331 of the connecting shaft 330. Accordingly, the internal gear 326 of the rotary bracket 320 disclosed herein may be formed between the hinge axis H and the connecting shaft 330 (e.g., on the second region 3252).

In an embodiment, the internal gear 326 may be formed on the first region 3251 having a smaller area than the second region 3252, among the inner walls of the opening 325. The internal gear 326 may include a smaller number of gear teeth when formed on the first region 3251 than when formed on the second region 3252. Accordingly, the reliability of the engagement of the rotary bracket 320 and the connecting shaft 330 may be enhanced, and the number of times that the gears are engaged with each other may be decreased, which results in an improvement in the performance of the hinge structure 200.

Figure 16:
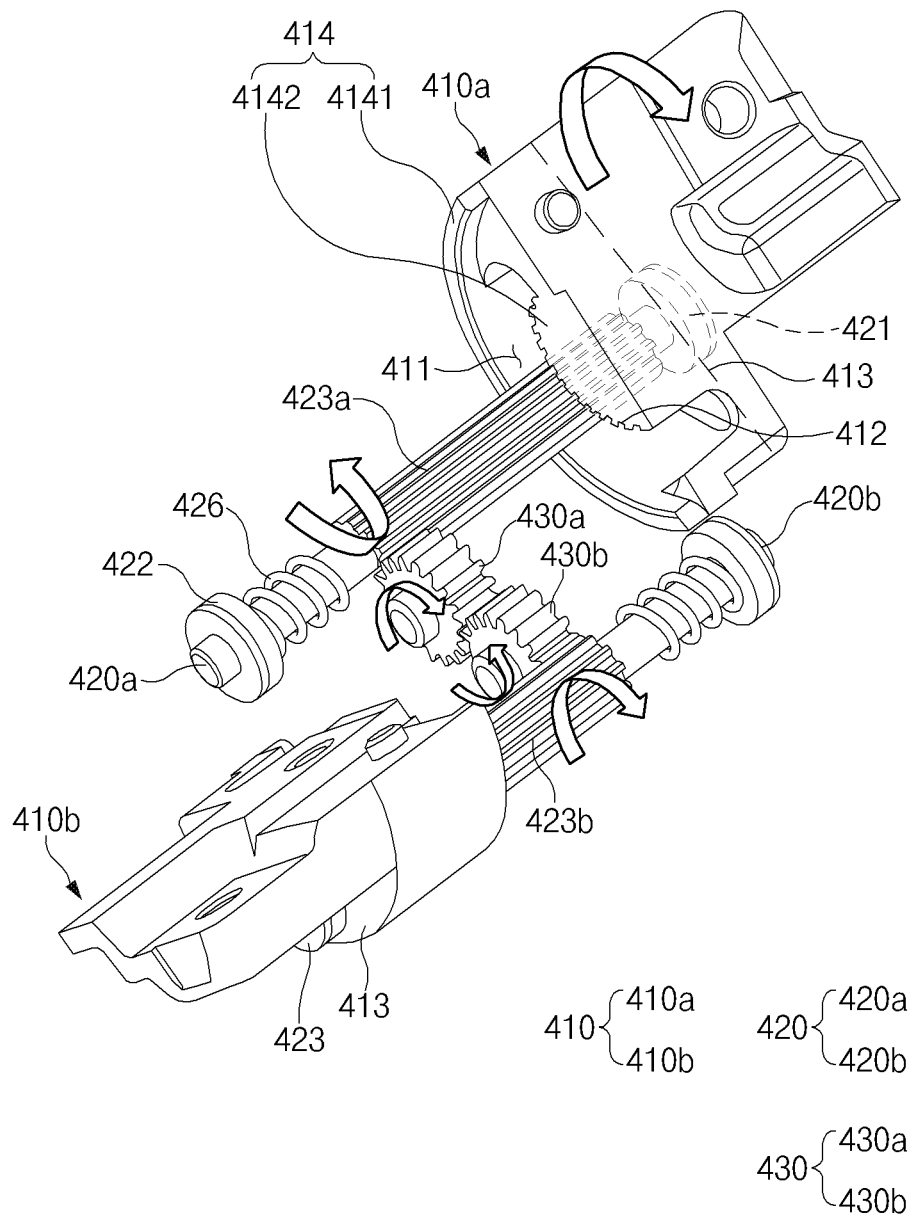
FIG. 16 is a view illustrating motion of a rotary bracket of the hinge structure according to certain embodiments.

FIG. 16 is a view illustrating motion of a rotary bracket of the hinge structure 200 according to certain embodiments. FIG. 16 illustrates the hinge structure from which a fixed bracket is omitted.

Referring to FIG. 16, the rotary bracket 410 (e.g., the first rotary bracket 220 or the second rotary bracket 230 of FIG. 8) may include an opening 411 that is formed in a substantially circular arc shape and through which a connecting shaft 420 (e.g., the first connecting shaft 240 or the second connecting shaft 250 of FIG. 8) passes, and an internal gear 412 formed on the inner wall of the opening 411. A gear (e.g., the first gear 241 or the second gear 251 of FIG. 8) that is formed on the connecting shaft 420 may be engaged with the internal gear 412. When viewed in the radial direction with respect to the central axis of the circular arc-shaped opening 411 (e.g., the hinge axis H of FIGS. 14A and 14B), the internal gear 412 may be formed between the connecting shaft 420 and the central axis of the opening 411. In certain embodiments, when the connecting shaft 420 rotates in a first rotational direction (e.g., the counterclockwise direction in the drawing), the rotary bracket 410 may rotate in a second rotational direction (e.g., the clockwise direction in the drawing).

In an embodiment, a first connecting shaft 420a and a second connecting shaft 420b may be connected by sub-gears 430 disposed between a first gear 423a and a second gear 423b. An even number of sub-gears 430 may be formed to rotate a first rotary bracket 410a and a second rotary bracket 410b in opposite directions. For example, referring to FIG. 16, the first connecting shaft 420a may rotate in the first rotational direction, a first sub-gear 430a may rotate in the second rotational direction, a second sub-gear 430b may rotate in the first rotational direction, and the second connecting shaft 420b may rotate in the second rotational direction. Accordingly, the first rotary bracket 410a and the second rotary bracket 410b may rotate in the opposite directions.

In an embodiment, the rotary bracket 410 may include a corresponding guide structure 414. The corresponding guide structure 414 may include dual guide portions 4141 and 4142. When the rotary bracket 410 rotates, the dual guide portions 4141 and 4142 may prevent the rotary bracket 410 from being separated from the fixed bracket (e.g., the fixed bracket 310 of FIGS. 13A and 13B) in the rotating direction. That is, the corresponding guide structure 414 may guide the rotary bracket 410 in the rotating direction.

In an embodiment, the connecting shaft 420 may include a first support part 421 (e.g., the first support part 281 or the third support part 283 of FIGS. 10A and 10B) that supports an axial side surface 413 of the rotary bracket 410, and a second support part 422 (e.g., the second support part 284 or the fourth support part 284 of FIGS. 10A and 10B) that supports an elastic member 426. The fixed bracket (e.g., the fixed bracket 310 of FIGS. 13A and 13B) and the rotary bracket 410 may be disposed between the first support part 421 and the second support part 422. The elastic member 426 may apply an elastic force to press the fixed bracket (e.g., the fixed bracket 310 of FIGS. 13A and 13B) in the direction toward the rotary bracket 410, and the first support part 421 may apply a reaction force to the rotary bracket 410 in the opposite direction to the direction of the elastic force. Accordingly, surface pressure formed by the elastic force and the reaction force may be formed between a side surface of the rotary bracket 410 and a side surface of the fixed bracket (e.g., the fixed bracket 310 of FIGS. 13A and 13B) that faces the side surface of the rotary bracket 410. The surface-pressure providing structure may prevent the rotary bracket 410 from being separated from the fixed bracket (e.g., the fixed bracket 310 of FIGS. 13A and 13B) in the axial direction when the rotary bracket 410 rotates. That is, the surface-pressure providing structure may guide the rotary bracket 410 in the axial direction.

A hinge structure 200 according to an embodiment of the disclosure may include at least one fixed bracket 210 having a first through-hole 215 and a second through-hole 217 formed therein, a first connecting shaft 240 extending in a first direction through the interior of the first through-hole 215 and including a first support part 281 formed on an end portion facing the first direction, a second support part 282 formed on an end portion facing a second direction opposite to the first direction, and a first gear 241 formed between the first support part 281 and the second support part 282, a first rotary bracket 220 that is disposed between the at least one fixed bracket 210 and the first support part 281 and that includes a first circular arc-shaped opening 325 through which the first connecting shaft 240 passes and a first internal gear formed on an inner wall of the first circular arc-shaped opening 325 and engaged with the first gear 241, in which the first rotary bracket 220 rotates about a first virtual axis H1 passing through the center of a circular arc of the first circular arc-shaped opening 325, a first elastic member 261, at least part of which is disposed in the first through-hole 215, the first elastic member being formed such that one side is supported by the second support part 282 and an opposite side presses the at least one fixed bracket 210 in a direction toward the first rotary bracket 220, a second connecting shaft 250 extending in the second direction through the interior of the second through-hole 217 and including a third support part 283 formed on an end portion facing the second direction, a fourth support part 284 formed on an end portion facing the first direction, and a second gear 251 formed between the third support part 283 and the fourth support part 284 and connected with the first gear 241, a second rotary bracket 230 that is disposed between the at least one fixed bracket 210 and the third support part 283 and that includes a second circular arc-shaped opening 325 through which the second connecting shaft 250 passes and a second internal gear formed on an inner wall of the second circular arc-shaped opening 325 and engaged with the second gear 251, in which the second rotary bracket 230 rotates about a second virtual axis H2 passing through the center of a circular arc of the second circular arc-shaped opening 325, and a second elastic member 262, at least part of which is disposed in the second through-hole 217, the second elastic member being formed such that one side is supported by the fourth support part 284 and an opposite side presses the at least one fixed bracket 210 in a direction toward the second rotary bracket 230. The at least one fixed bracket 210 is disposed between the first rotary bracket 220 and the second rotary bracket 230.

In certain embodiments, the first through-hole 215 may include a first portion 215-1 in which the at least part of the first elastic member 261 is disposed and that has a first diameter, a second portion 215-2 having a second diameter larger than the first diameter, and a first step 215-3 formed between the first portion and the second portion, the first elastic member 261 may be formed such that the opposite side thereof presses the first step 215-3, the second through-hole 217 may include a third portion (e.g., 217-1) in which the at least part of the second elastic member 262 is disposed and that has a third diameter, a fourth portion (e.g., 217-2) having a fourth diameter larger than the third diameter, and a second step 217-3 formed between the third portion (e.g., 217-1) and the fourth portion (e.g., 217-2), and the second elastic member 262 may be formed such that the opposite side thereof presses the second step 217-3.

In certain embodiments, the first elastic member 261 and the second elastic member 262 may include coil springs, respectively, and the coil springs may be disposed in the first through-hole 215 and the second through-hole 217, respectively, to have a length smaller than that in an equilibrium state.

In certain embodiments, the first connecting shaft 240 may have first grooves 243 formed thereon, the first grooves having a diameter smaller than a diameter of the first connecting shaft 240, each of the first support part 281 and the second support 282 may include a fixing ring 280-2 disposed in a corresponding one of the first grooves 243 and a washer member 280-1 disposed between the fixing ring 280-2 and the first gear 241, the second connecting shaft 250 may have second grooves 253 formed thereon, the second grooves having a diameter smaller than a diameter of the second connecting shaft 250, and each of the third support part 283 and the fourth support 284 may include a fixing ring 280-2 disposed in a corresponding one of the second grooves 253 and a washer member 280-1 disposed between the fixing ring 280-2 and the second gear 251.

In certain embodiments, the first connecting shaft 240 and the second connecting shaft 250 may be connected through an even number of sub-gears 273 and 274 to rotate in opposite directions, and the sub-gears 273 and 274 may be disposed in the at least one fixed bracket.

In certain embodiments, the at least one fixed bracket 210 may include a first fixed bracket 210-1 connected to the first rotary bracket 220 and a second fixed bracket 210-2 connected to the second rotary bracket 230, and each of the sub-gears may be disposed between the first fixed bracket 210-1 and the second fixed bracket 210-2.

In certain embodiments, each of the first fixed bracket 210-1 and the second fixed bracket 210-2 may have a support recess 318 that supports rotation of a sub-connecting shaft 340 on which the sub-gear 343 is formed, the sub-gear 343 may include a facing surface 344 that faces a surrounding area 3183 of the support recess 318, and the sub-connecting shaft 340 may be disposed in the support recess 318 such that the facing surface 344 and the surrounding area 3183 of the support recess 318 linearly contact with each other.

In certain embodiments, at least one of the facing surface 344 and the surrounding area 3183 of the support recess 318 may have a beveled edge.

In certain embodiments, the hinge structure may further include a hinge housing 150 having the at least one fixed bracket 210, the first rotary bracket 220, and the second rotary bracket 230 disposed therein, the hinge housing containing a metallic material.

The at least one fixed bracket 210 may be fixed to the hinge housing 150, the first rotary bracket 220 and the second rotary bracket 230 may be spaced apart from the inside of the hinge housing 150 at a predetermined interval, and the at least one fixed bracket 210 may include a seating area 212a seated on the inside of the hinge housing 150 and a corresponding structure (e.g., the hole 159) coupled with an internal structure 158 in the hinge housing 150.

The seating area 212a and the corresponding structure (e.g., the hole 159) may be formed of an insulating material.

In certain embodiments, the at least one fixed bracket 210 may include a first surface 211 that faces the inside of the hinge housing 150 and a second surface 212 opposite to the first surface 211, and a recess 2111 may be formed on the second surface 212.

In certain embodiments, the first internal gear may be formed between the first virtual axis H1 and the first connecting shaft 240 when viewed in a radial direction with respect to the first virtual axis H1, and the second internal gear may be formed between the second virtual axis H2 and the second connecting shaft 250 when viewed in a radial direction with respect to the second virtual axis H2.

In certain embodiments, the inner wall of the first circular arc-shaped opening 325 may include a first region 3251 spaced apart from the first virtual axis H1 by a first distance and a second region 3252 spaced apart from the first virtual axis by a second distance shorter than the first distance, the first internal gear may be formed on the second region 3252, the inner wall of the second circular arc-shaped opening 325 may include a third region 3251 spaced apart from the second virtual axis H2 by a third distance and a fourth region 3252 spaced apart from the second virtual axis by a fourth distance shorter than the third distance, and the second internal gear may be formed on the fourth region 3252.

An electronic device 100 according to embodiments of the disclosure may include a housing structure including a first housing 121, a second housing 122, and a hinge housing 150 disposed between the first housing 121 and the second housing 122, a flexible display 110 that is disposed on the housing structure so as to extend from the first housing 121 to the second housing 122 and that includes a first area 111 formed of a flat surface, a second area 112 formed of a flat surface, and a folding area 113 formed between the first area 111 and the second area 112 and formed of a flat surface or a curved surface, a hinge structure 200 that is disposed in the hinge housing 150 and disposed between the first housing 121 and the second housing 122 to rotate the first housing 121 and the second housing 122 about a folding axis and that includes a first rotary structure 220 connected with the first housing 121, a second rotary structure 230 connected with the second housing 122, and at least one fixed structure 210 disposed between the first rotary structure 220 and the second rotary structure 230, and metal layers 115 and 116 that are disposed between the hinge structure 200 and the flexible display 110 and that include attached areas 1151 and 1161 attached to the first area 111 and the second area 112, respectively, and unattached areas 1152 and 1162 extending from the attached areas 1151 and 1161 to the folding area 113. The electronic device 100 may include a first state in which the folding area 113 is formed of a flat surface and a second state in which the folding area 113 is formed of a curved surface. The first rotary structure 220 and the second rotary structure 230 may rotate about a first hinge axis H1 and a second hinge axis H2, respectively, when the electronic device 100 moves from the first state to the second state. The unattached areas 1152 and 1162 of the metal layers 115 and 116 may extend from the attached areas 1151 and 1161 in a tangential direction of the folding area 113 in the second state. The at least one fixed structure 210 may include a recess 2111 formed on a surface facing the metal layers 115 and 116 in the first state so as to receive at least parts of the unattached areas 1152 and 1162 in the second state.

In certain embodiments, the unattached areas 1152 and 1162 may be spaced apart from the at least one fixed structure 210 by at least a predetermined interval or more in the first state and the second state.

In certain embodiments, the hinge structure 200 may include a first connecting shaft 240 that passes through the at least one fixed structure 210 and the first rotary structure 220 and that includes a first support part 281 formed on a first end portion to support the first rotary structure 220 and a second support part 282 formed on a second end portion to support the at least one fixed structure 210, a first elastic member 261 supported by the second support part 282 and formed to press the at least one fixed structure 210 in a direction toward the first rotary structure 220, a second connecting shaft 250 that passes through the at least one fixed structure 210 and the second rotary structure 230 and that includes a third support part 283 formed on a third end portion to support the second rotary structure 230 and a fourth support part 284 formed on a fourth end portion to support the at least one fixed structure 210, and a second elastic member 262 supported by the fourth support part 284 and formed to press the at least one fixed structure 210 in a direction toward the second rotary structure 230.

In certain embodiments, the at least one fixed structure 210 may have a first through-hole 215 formed therein through which the first connecting shaft 240 extends and a second through-hole 217 formed therein through which the second connecting shaft 250 extends. A first step 215-3 may be formed in the first through-hole 215 in a direction toward the center of the first through-hole 215, and the first elastic member 261 may include a first coil spring extending from the second support part 282 to the first step 215-3 along an outer circumferential surface of the first connecting shaft 240. A second step 217-3 may be formed in the second through-hole 217 in a direction toward the center of the second through-hole 217, and the second elastic member 262 may include a second coil spring extending from the fourth support part 284 to the second step 217-3 along an outer circumferential surface of the second connecting shaft 250. The first coil spring and the second coil spring may be disposed in a compressed state.

In certain embodiments, the first rotary structure 220 may include a first internal gear formed on an inner wall of a first opening 325 through which the first connecting shaft 240 passes, the first opening 325 may be formed in a circular arc shape with the first hinge axis H1 as the center thereof, and the first internal gear may be formed between the first hinge axis H1 and the first connecting shaft 240. The second rotary structure 230 may include a second internal gear formed on an inner wall of a second opening 325 through which the second connecting shaft 250 passes, the second opening 325 may be formed in a circular arc shape with the second hinge axis H2 as the center thereof, and the second internal gear may be formed between the second hinge axis H2 and the second connecting shaft 250.

In certain embodiments, the at least one fixed structure 210 may include a first guide structure 350 protruding toward the first rotary structure 220 and a second guide structure 350 protruding toward the second rotary structure 230. The first rotary structure 220 may include a first corresponding guide structure 360 corresponding to the first guide structure 350, and the first corresponding guide structure 360 may include a first portion 360-1 that supports a radially outer portion of the first guide structure 350 with respect to the first hinge axis H1 and a second portion 360-2 that supports a radially inner portion of the first guide structure 350 with respect to the first hinge axis H1. The second rotary structure 230 may include a second corresponding guide structure 360 corresponding to the second guide structure 350, and the second corresponding guide structure 360 may include a third portion 350-1 that supports a radially outer portion of the second guide structure 350 with respect to the second hinge axis H2 and a fourth portion 350-2 that supports a radially inner portion of the second guide structure 350 with respect to the second hinge axis H2.

In certain embodiments, the first guide structure 350 of the at least one fixed structure 210 may include a first guide area 352 that guides the first portion 360-1 and that has a circular arc shape with a first radius of curvature from the first hinge axis H1 and a second guide area 353 that guides the second portion 360-2 and that has a circular arc shape with a second radius of curvature from the first hinge axis H1, the second radius of curvature being smaller than the first radius of curvature. The first guide area 352 and the second guide area 353 may be formed such that an angle of arc of the second guide area 353 is smaller than an angle of arc of the first guide area 352. The second guide structure 350 of the at least one fixed structure 210 may include a third guide area 362 that guides the third portion 360-1 and that has a circular arc shape with the first radius of curvature from the second hinge axis H2 and a fourth guide area 363 that guides the fourth portion 360-2 and that has a circular arc shape with the second radius of curvature from the second hinge axis H2. The third guide area 362 and the fourth guide area 363 may be formed such that an angle of arc of the fourth guide area 363 is smaller than an angle of arc of the third guide area 362.

In certain embodiments, the first guide structure 350 and the second guide structure 350 may form part of a bottom surface of the recess 2111 and part of an inner wall of the recess 2111 so as not to overlap the recess 2111 when viewed in axial directions of the first hinge axis H1 and the second hinge axis H2.

According to the embodiments of the disclosure, the hinge structure may be made compact, and the entire thickness of the foldable electronic device may be decreased. According to the embodiments of the disclosure, the areas of the metal layers disposed on the rear surface of the flexible display may be increased, which results in an improvement in surface quality. According to the embodiments of the disclosure, electricity may be prevented from being conducted to the hinge housing, which makes it possible to prevent an electric-shock accident. According to the embodiments of the disclosure, the connecting shafts may be prevented from being separated from the internal gears when the rotary brackets rotate, and the number of gear teeth of the internal gears engaged with the gears of the connecting shafts may be decreased, which results in an improvement in the performance of the hinge structure. According to the embodiments of the disclosure, the fixed bracket and the gears may linearly contact with each other, which results in a reduction in gear wear and noise of the hinge structure.

In addition, the disclosure may provide various effects that are directly or indirectly recognized.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program) including one or more instructions that are stored in a storage medium (e.g., internal memory or external memory) that is readable by a machine (e.g., the electronic device). For example, a processor(e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the disclosure as defined by the appended claims and their equivalents.

What is claimed is:

1. A hinge structure, comprising:
    at least one fixed bracket including a first through-hole and a second through-hole formed therein;
    a first connecting shaft extending in a first direction through an interior of the first through-hole and including a first support part formed on an end portion of the first connecting shaft and facing the first direction, a second support part formed on the end portion of the first connecting shaft facing a second direction opposite to the first direction, and a first gear formed between the first support part and the second support part;
    a first rotary bracket disposed between the at least one fixed bracket and the first support part, the first rotary bracket including a first circular arc-shaped opening through which the first connecting shaft passes, and a first internal gear formed on an inner wall of the first circular arc-shaped opening and engaged with the first gear, wherein the first rotary bracket rotates about a first virtual axis passing through the center of a circular arc of the first circular arc-shaped opening;
    a first elastic member, at least part of which is disposed in the first through-hole, the first elastic member being formed such that one side of the first elastic member is supported by the second support part and an opposite side of the first elastic member presses the at least one fixed bracket towards the first rotary bracket;
    a second connecting shaft extending in the second direction through the interior of the second through-hole and including a third support part formed on an end portion of the second connecting shaft facing the second direction, a fourth support part formed on the end portion of the second connecting shaft and facing the first direction, and a second gear formed between the third support part and the fourth support part and connected with the first gear;
    a second rotary bracket disposed between the at least one fixed bracket and the third support part, the second rotary bracket including a second circular arc-shaped opening through which the second connecting shaft passes and a second internal gear formed on an inner wall of the second circular arc-shaped opening and engaged with the second gear, wherein the second rotary bracket rotates about a second virtual axis passing through the center of a circular arc of the second circular arc-shaped opening; and
    a second elastic member, at least part of which is disposed in the second through-hole, the second elastic member being formed such that one side of the second elastic member is supported by the fourth support part and an opposite side of the second elastic member presses the at least one fixed bracket towards the second rotary bracket,
    wherein the at least one fixed bracket is disposed between the first rotary bracket and the second rotary bracket.

2. The hinge structure of claim 1, wherein the first through-hole includes a first portion in which the at least part of the first elastic member is disposed, the first through-hole formed having a first diameter, and including a second portion having a second diameter larger than the first diameter, and a first step formed between the first portion and the second portion,
    wherein the first elastic member is formed such that the opposite side thereof presses against the first step,
    wherein the second through-hole includes a third portion in which the at least part of the second elastic member is disposed, the second through-hole formed having a third diameter, and including a fourth portion having a fourth diameter larger than the third diameter, and a second step formed between the third portion and the fourth portion, and wherein the second elastic member is formed such that the opposite side thereof presses against the second step.

3. The hinge structure of claim 2, wherein the first elastic member and the second elastic member include coil springs, respectively, and wherein the coil springs are disposed in the first through-hole and the second through-hole, respectively, as to be compressed when disposed therein.

4. The hinge structure of claim 1, wherein the first connecting shaft defines first grooves formed thereon, each of the first grooves having a diameter smaller than a diameter of the first connecting shaft, wherein each of the first support part and the second support includes a fixing ring disposed in a corresponding groove from among the first grooves and a washer member disposed between the fixing ring and the first gear, wherein the second connecting shaft defines second grooves formed thereon, each of the second grooves having a diameter smaller than a diameter of the second connecting shaft, and wherein each of the third support part and the fourth support includes a fixing ring disposed in a corresponding groove from among the second grooves and a washer member disposed between the fixing ring and the second gear.

5. The hinge structure of claim 1, wherein the first connecting shaft and the second connecting shaft are connected through an even number of sub-gears to be rotatable in opposite directions, and wherein the sub-gears are disposed in the at least one fixed bracket.

6. The hinge structure of claim 5, wherein the at least one fixed bracket includes a first fixed bracket connected to the first rotary bracket, and a second fixed bracket connected to the second rotary bracket, and wherein each of the sub-gears is disposed between the first fixed bracket and the second fixed bracket.

7. The hinge structure of claim 6, wherein each of the first fixed bracket and the second fixed bracket includes a support recess configured to support rotation of a sub-connecting shaft on which the sub-gear is formed, wherein the sub-gear includes a facing surface configured to face a surrounding area of the support recess, and wherein the sub-connecting shaft is disposed in the support recess such that the facing surface and the surrounding area of the support recess linearly contact with each other.

8. The hinge structure of claim 7, wherein at least one of the facing surface and the surrounding area of the support recess includes a beveled edge.

9. The hinge structure of claim 1, further comprising:

a hinge housing including the at least one fixed bracket, the first rotary bracket, and the second rotary bracket disposed therein, the hinge housing including a metallic material, wherein the at least one fixed bracket is affixed to the hinge housing, wherein the first rotary bracket and the second rotary bracket are spaced apart from an interior of the hinge housing at a predetermined interval, wherein the at least one fixed bracket includes a seating area disposed on the interior of the hinge housing, and a corresponding structure coupled with an internal structure disposed within the hinge housing, and wherein the seating area and the corresponding structure are formed of an insulating material.

10. The hinge structure of claim 9, wherein the at least one fixed bracket includes a first surface disposed facing the interior of the hinge housing, and a second surface disposed opposite to the first surface, and wherein a recess is formed on the second surface.

11. The hinge structure of claim 1, wherein the first internal gear is formed between the first virtual axis and the first connecting shaft when viewed in a radial direction with respect to the first virtual axis, and wherein the second internal gear is formed between the second virtual axis and the second connecting shaft when viewed in the radial direction with respect to the second virtual axis.

12. The hinge structure of claim 1, wherein the inner wall of the first circular arc-shaped opening includes a first region spaced apart from the first virtual axis by a first distance, and a second region spaced apart from the first virtual axis by a second distance shorter than the first distance, wherein the first internal gear is formed on the second region, wherein the inner wall of the second circular arc-shaped opening includes a third region spaced apart from the second virtual axis by a third distance, and a fourth region spaced apart from the second virtual axis by a fourth distance shorter than the third distance, and wherein the second internal gear is formed on the fourth region.

13. An electronic device, comprising:

a housing structure including a first housing, a second housing, and a hinge housing disposed between the first housing and the second housing;

a flexible display disposed on the housing structure so as to extend from the first housing to the second housing, the flexible display including a first area formed as a flat surface, a second area formed as a flat surface, and a folding area disposed between the first area and the second area, and configured as capable of being disposed as a flat surface or a curved surface;

a hinge structure disposed in the hinge housing, the hinge structure disposed between the first housing and the second housing to enable rotation of the first housing and the second housing about a folding axis, wherein the hinge structure includes a first rotary structure connected with the first housing, a second rotary structure connected with the second housing, and at least one fixed structure disposed between the first rotary structure and the second rotary structure; and metal layers disposed between the hinge structure and the flexible display, the metal layers including attached areas attached to the first area and the second area, respectively, and unattached areas extending from the attached areas to the folding area, wherein the electronic device includes a first state in which the folding area is disposed as a flat surface and a second state in which the folding area is disposed as a curved surface, wherein the first rotary structure and the second rotary structure are configured to rotate about a first hinge axis and a second hinge axis, respectively, when the electronic device moves from the first state to the second state, wherein the unattached areas of the metal layers extend from the attached areas in a tangential direction of the folding area in the second state, and wherein the at least one fixed structure defines a recess on a surface facing the metal layers in the first state, the recess disposed to receive at least parts of the unattached areas when the electronic device is disposed in the second state.

14. The electronic device of claim 13, wherein the unattached areas are spaced apart from the at least one fixed structure by a predetermined interval in the first state and the second state.

15. The electronic device of claim 13, wherein the hinge structure further includes:
   a first connecting shaft passing through the at least one fixed structure and the first rotary structure, the first connecting shaft including a first support part formed on a first end portion of the first connecting shaft to support the first rotary structure, and a second support part formed on a second end portion of the first connecting shaft to support the at least one fixed structure;
   a first elastic member supported by the second support part and formed to press the at least one fixed structure in a direction towards the first rotary structure;
   a second connecting shaft passing through the at least one fixed structure and the second rotary structure, the second connecting shaft including a third support part formed on a third end portion of the second connecting shaft to support the second rotary structure, and a fourth support part formed on a fourth end portion of the second connecting shaft to support the at least one fixed structure; and
   a second elastic member supported by the fourth support part and formed to press the at least one fixed structure in a direction towards the second rotary structure.

16. The electronic device of claim 15, wherein the at least one fixed structure includes a first through-hole formed therein, through which the first connecting shaft extends, and a second through-hole formed therein through which the second connecting shaft extends,
   wherein a first step is formed in the first through-hole oriented towards the center of the first through-hole,
   wherein the first elastic member includes a first coil spring extending from the second support part to the first step along an outer circumferential surface of the first connecting shaft,
   wherein a second step is formed in the second through-hole oriented towards the center of the second through-hole,
   wherein the second elastic member includes a second coil spring extending from the fourth support part to the second step along an outer circumferential surface of the second connecting shaft, and
   wherein the first coil spring and the second coil spring are disposed within the first and second elastic members, respectively, in a compressed state.

17. The electronic device of claim 15, wherein the first rotary structure includes a first internal gear formed on an inner wall of a first opening through which the first connecting shaft passes,
   wherein the first opening is formed in a circular arc shape, with the first hinge axis as the center thereof,
   wherein the first internal gear is formed between the first hinge axis and the first connecting shaft, wherein the second rotary structure includes a second internal gear formed on an inner wall of a second opening through which the second connecting shaft passes,
   wherein the second opening is formed in a circular arc shape, with the second hinge axis as the center thereof, and
   wherein the second internal gear is formed between the second hinge axis and the second connecting shaft.

18. The electronic device of claim 13, wherein the at least one fixed structure includes a first guide structure protruding towards the first rotary structure, and a second guide structure protruding towards the second rotary structure,
   wherein the first rotary structure includes a first corresponding guide structure corresponding to the first guide structure,
   wherein the first corresponding guide structure includes a first portion configured to support a radially exterior portion of the first guide structure with respect to the first hinge axis, and a second portion configured to support a radially interior portion of the first guide structure with respect to the first hinge axis,
   wherein the second rotary structure includes a second corresponding guide structure corresponding to the second guide structure, and
   wherein the second corresponding guide structure includes a third portion configured to support a radially exterior portion of the second guide structure with respect to the second hinge axis and a fourth portion configured to support a radially interior portion of the second guide structure with respect to the second hinge axis.

19. The electronic device of claim 18, wherein the first guide structure of the at least one fixed structure further includes:
   a first guide area configured to guide the first portion, the first guide area having a circular arc shape defining a first radius of curvature from the first hinge axis; and
   a second guide area configured to guide the second portion, the second guide area having a circular arc shape defining a second radius of curvature from the first hinge axis, wherein the second radius of curvature is smaller than the first radius of curvature,
   wherein the first guide area and the second guide area are formed such that an arc angle of the second guide area is smaller than an arc angle of the first guide area,
   wherein the second guide structure of the at least one fixed structure includes:
   a third guide area configured to guide the third portion, the third guide area having a circular arc shape with the first radius of curvature from the second hinge axis; and
   a fourth guide area configured to guide the fourth portion, the fourth guide area having a circular arc shape with the second radius of curvature from the second hinge axis, and
   wherein the third guide area and the fourth guide area are formed such that an angle of arc of the fourth guide area is smaller than an angle of arc of the third guide area.

20. The electronic device of claim 18, wherein the first guide structure and the second guide structure form part of a bottom surface of the recess and part of an inner wall of the recess, such that the first and second guide structures do not to overlap the recess, when viewed from an axial direction of the first hinge axis and the second hinge axis.

* * * * *